(12) United States Patent
Kim

(10) Patent No.: US 7,259,807 B2
(45) Date of Patent: Aug. 21, 2007

(54) METHOD OF MANUFACTURING THIN FILM TRANSISTOR ARRAY PANEL AND LIQUID CRYSTAL DISPLAY

(75) Inventor: Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 172 days.

(21) Appl. No.: 10/877,590

(22) Filed: Jun. 25, 2004

(65) Prior Publication Data

US 2004/0263709 A1    Dec. 30, 2004

(30) Foreign Application Priority Data

Jun. 26, 2003   (KR) .................. 10-2003-0041990

(51) Int. Cl.
*G02F 1/136* (2006.01)
(52) U.S. Cl. ........................ 349/43; 257/797
(58) Field of Classification Search .................. 257/59, 257/72, 797; 349/43
See application file for complete search history.

(56) References Cited

U.S. PATENT DOCUMENTS

| | | | | |
|---|---|---|---|---|
| 5,910,830 A | * | 6/1999 | Nam ........................... | 349/158 |
| 6,373,548 B1 | * | 4/2002 | Kim ............................ | 349/158 |
| 6,734,931 B2 | * | 5/2004 | Yu ............................... | 349/106 |
| 6,787,930 B1 | * | 9/2004 | Nakata et al. .............. | 257/797 |
| 6,803,975 B2 | * | 10/2004 | Kim et al. ................... | 349/43 |

\* cited by examiner

*Primary Examiner*—David Nelms
*Assistant Examiner*—David Chung
(74) *Attorney, Agent, or Firm*—Don C. Lawrence; MacPherson Kwok Chen & Heid LLP

(57) ABSTRACT

A method of manufacturing a thin film transistor array panel is provided, which includes: forming a gate line including a gate electrode on a substrate; depositing a gate insulating layer; forming a semiconductor layer on the gate insulating layer; forming an ohmic contact layer on the semiconductor layer; forming a data line including a source electrode and a drain electrode on the ohmic contact layer at least in part; forming an alignment key including the same layer as the data line; coating a first photosensitive film for a color filter; aligning a mask for color filter with the substrate provided with the first photosensitive film using the alignment key; forming a first color filter by light exposure and developing the first photosensitive film; and forming a pixel electrode connected to the drain electrode.

25 Claims, 40 Drawing Sheets

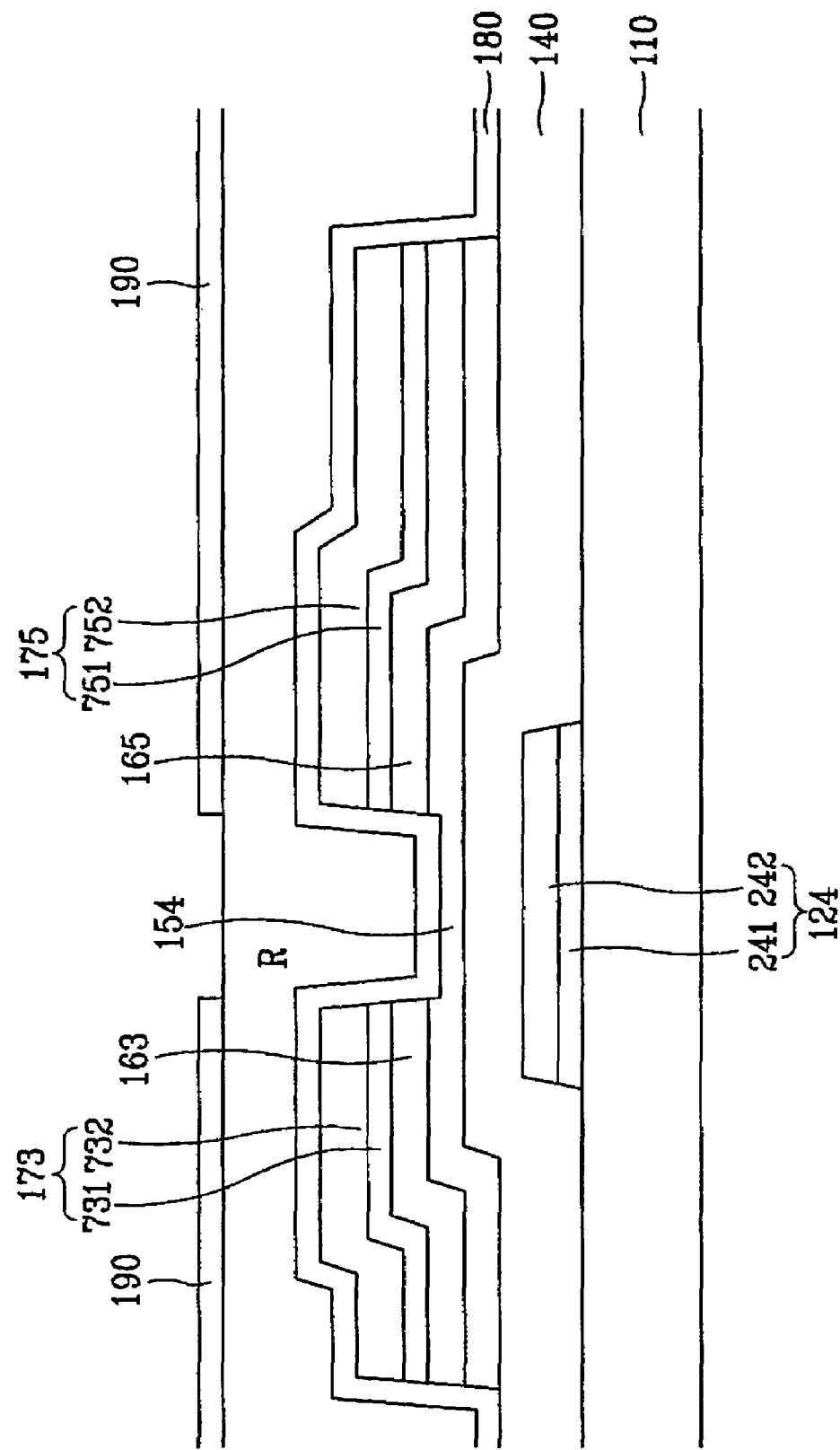

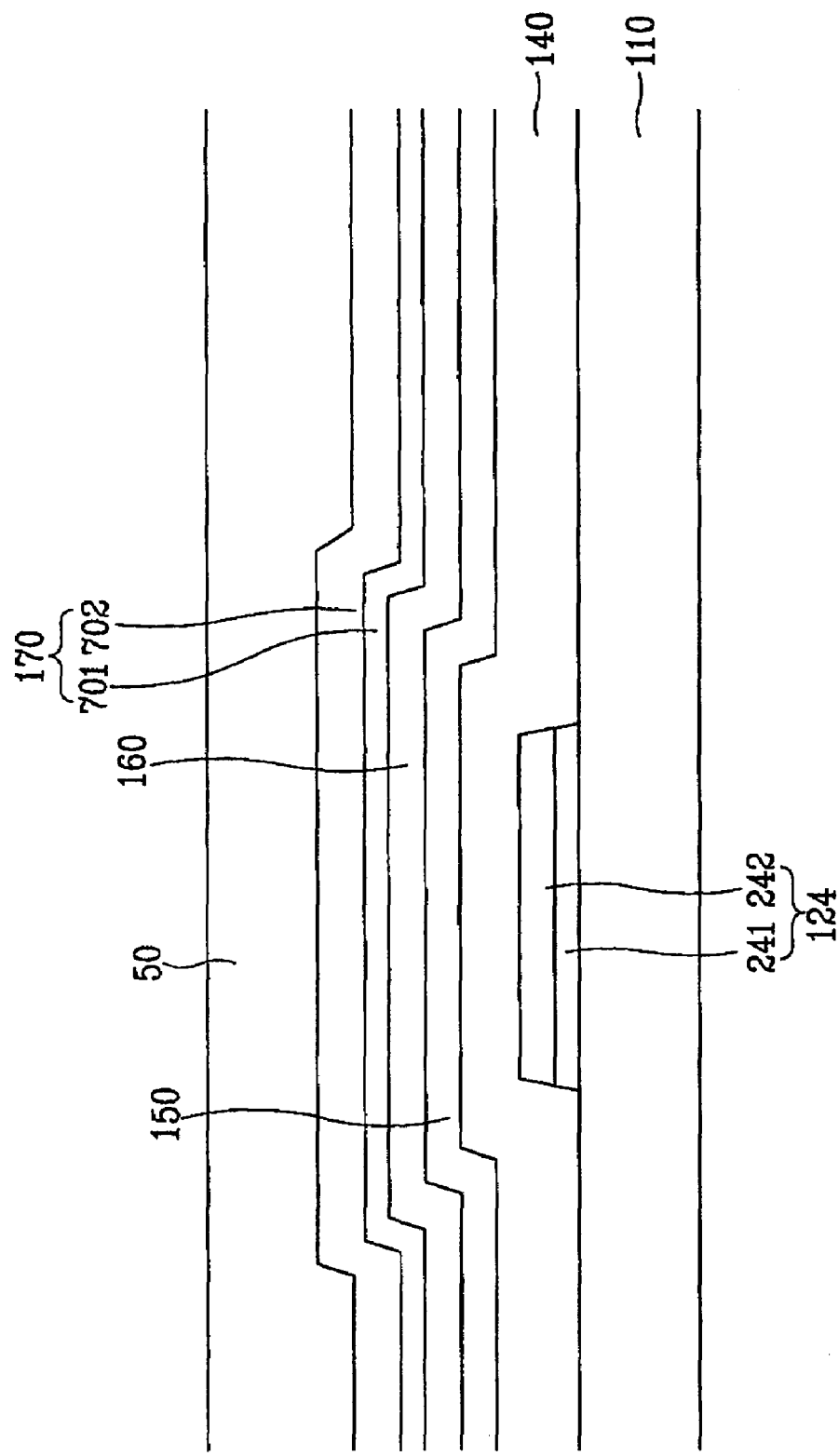

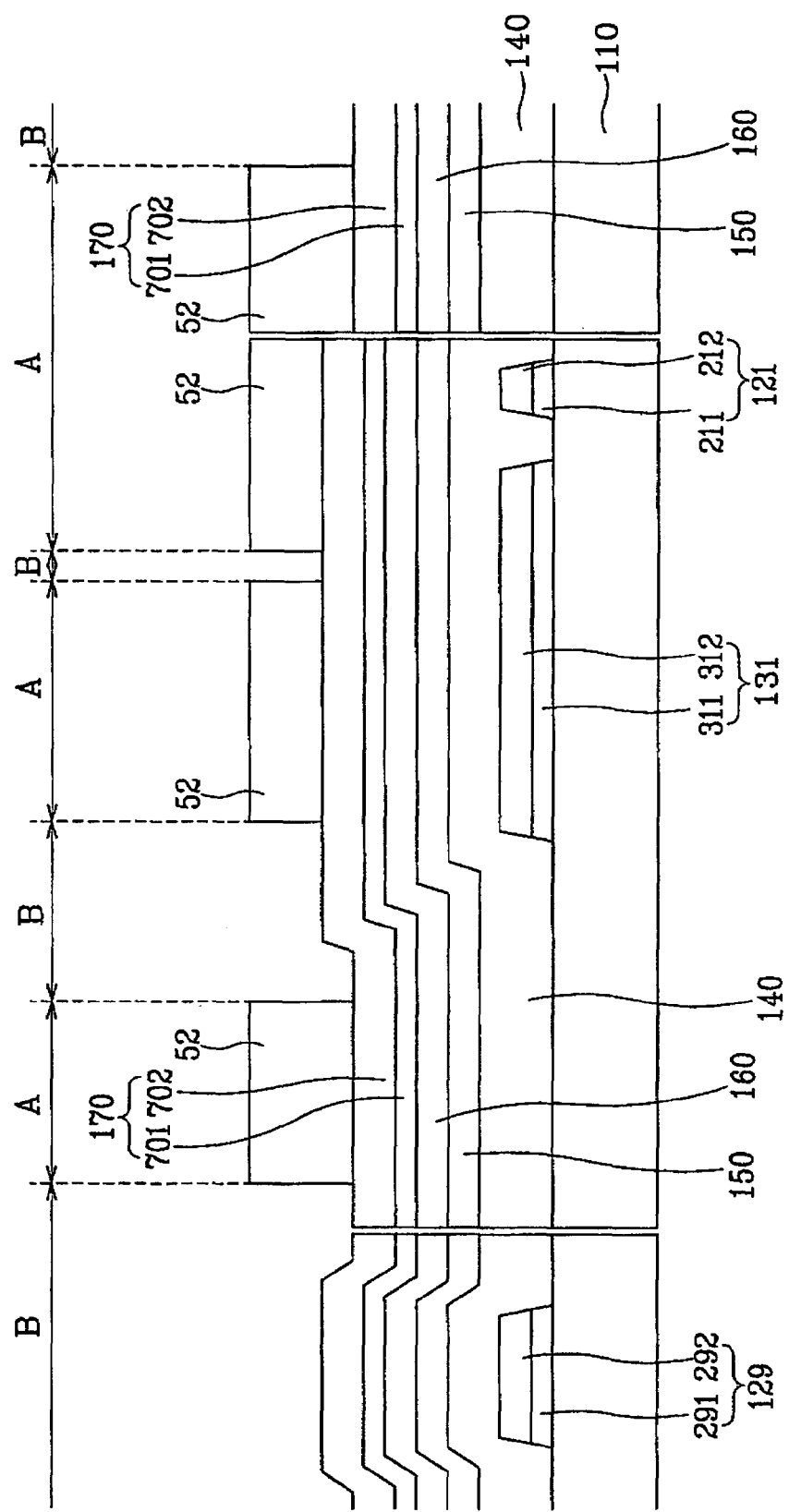

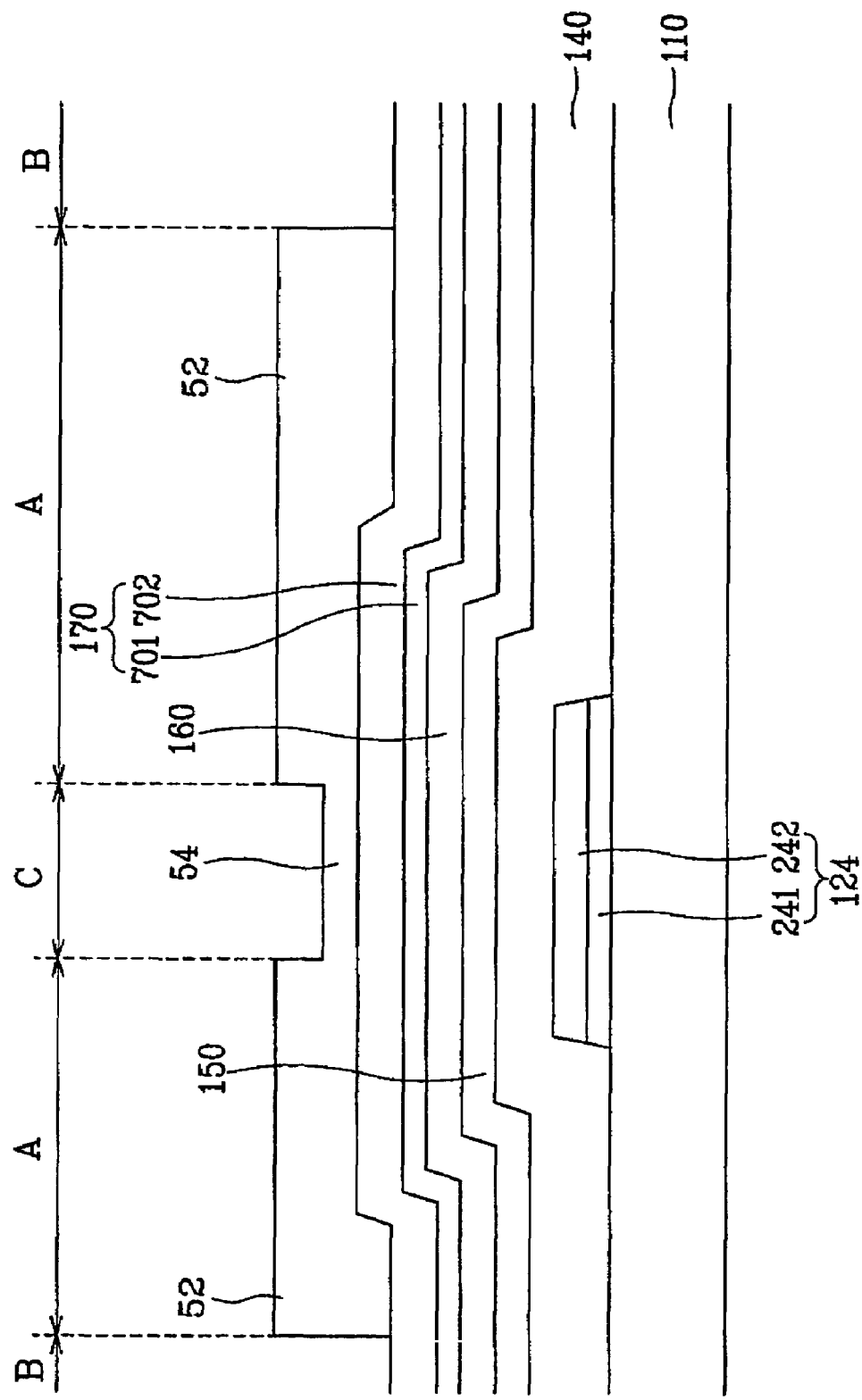

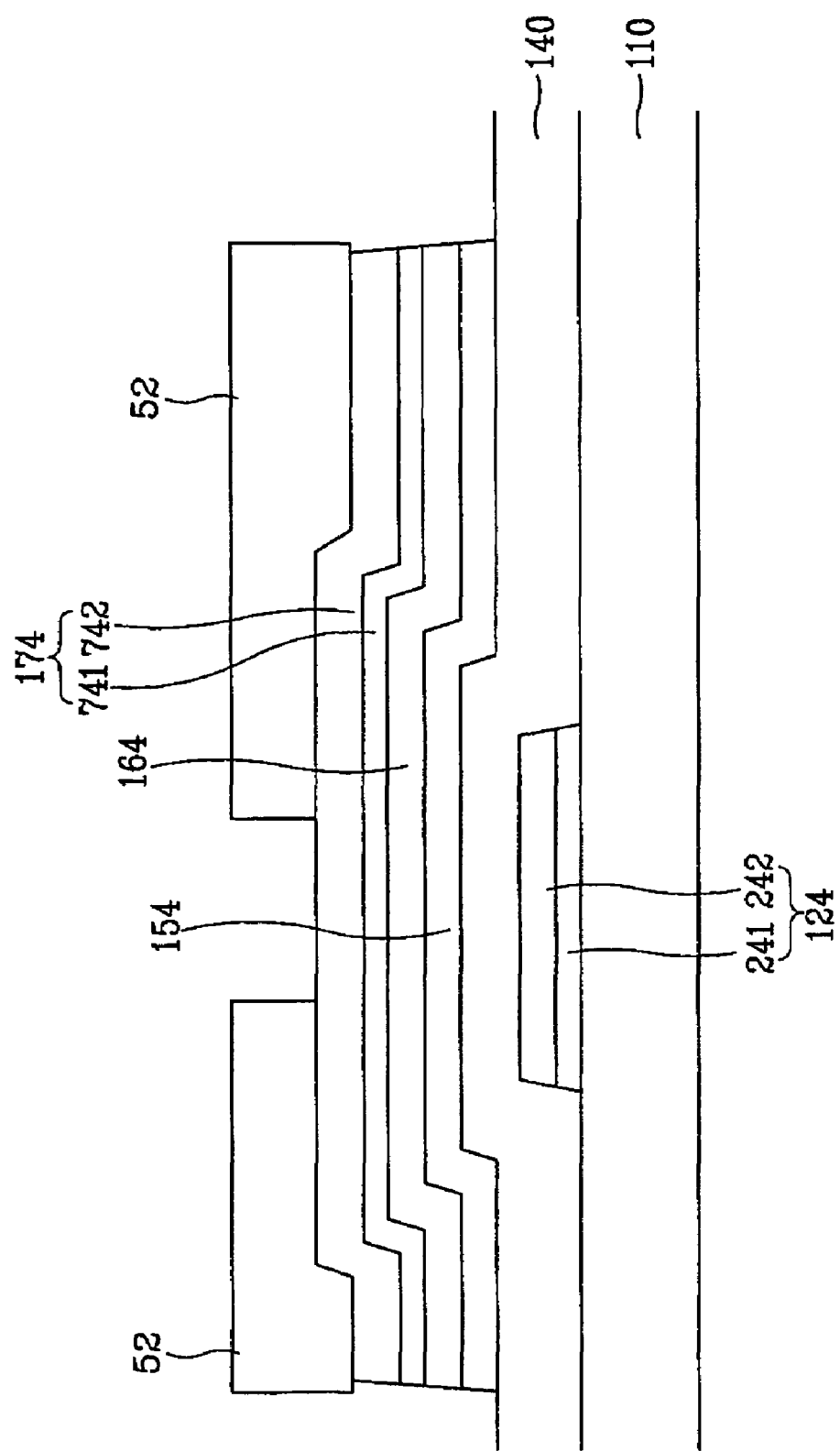

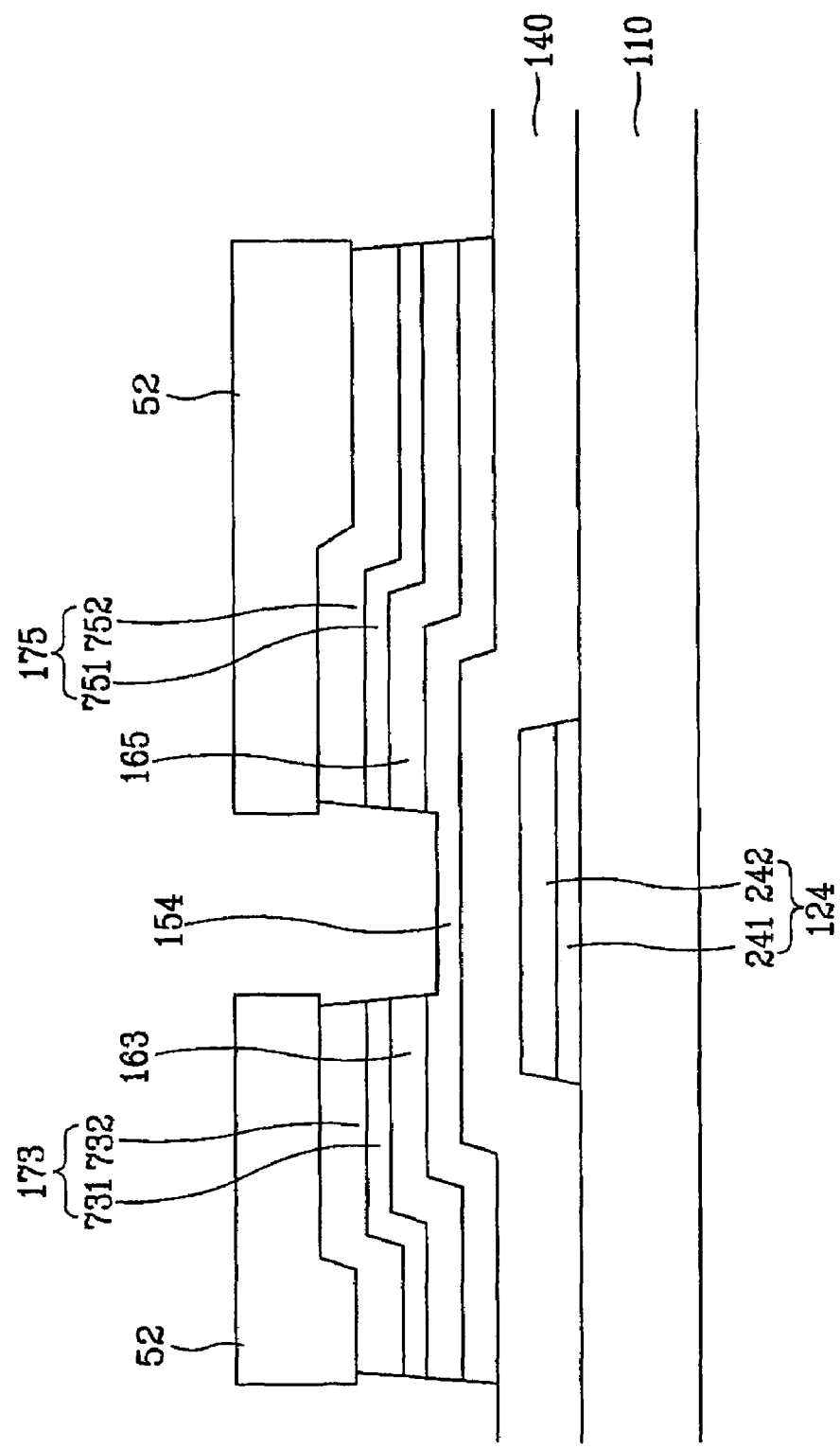

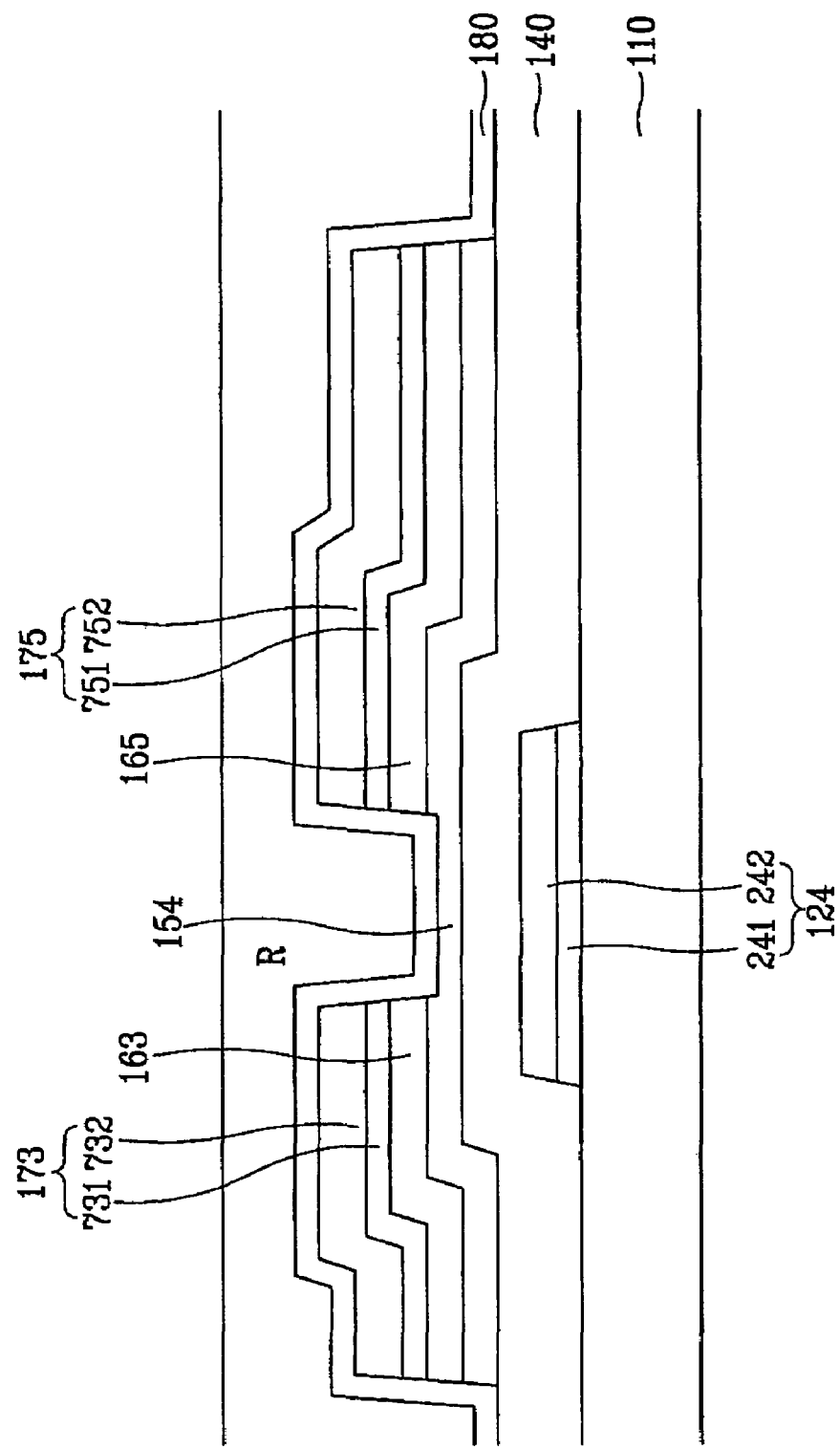

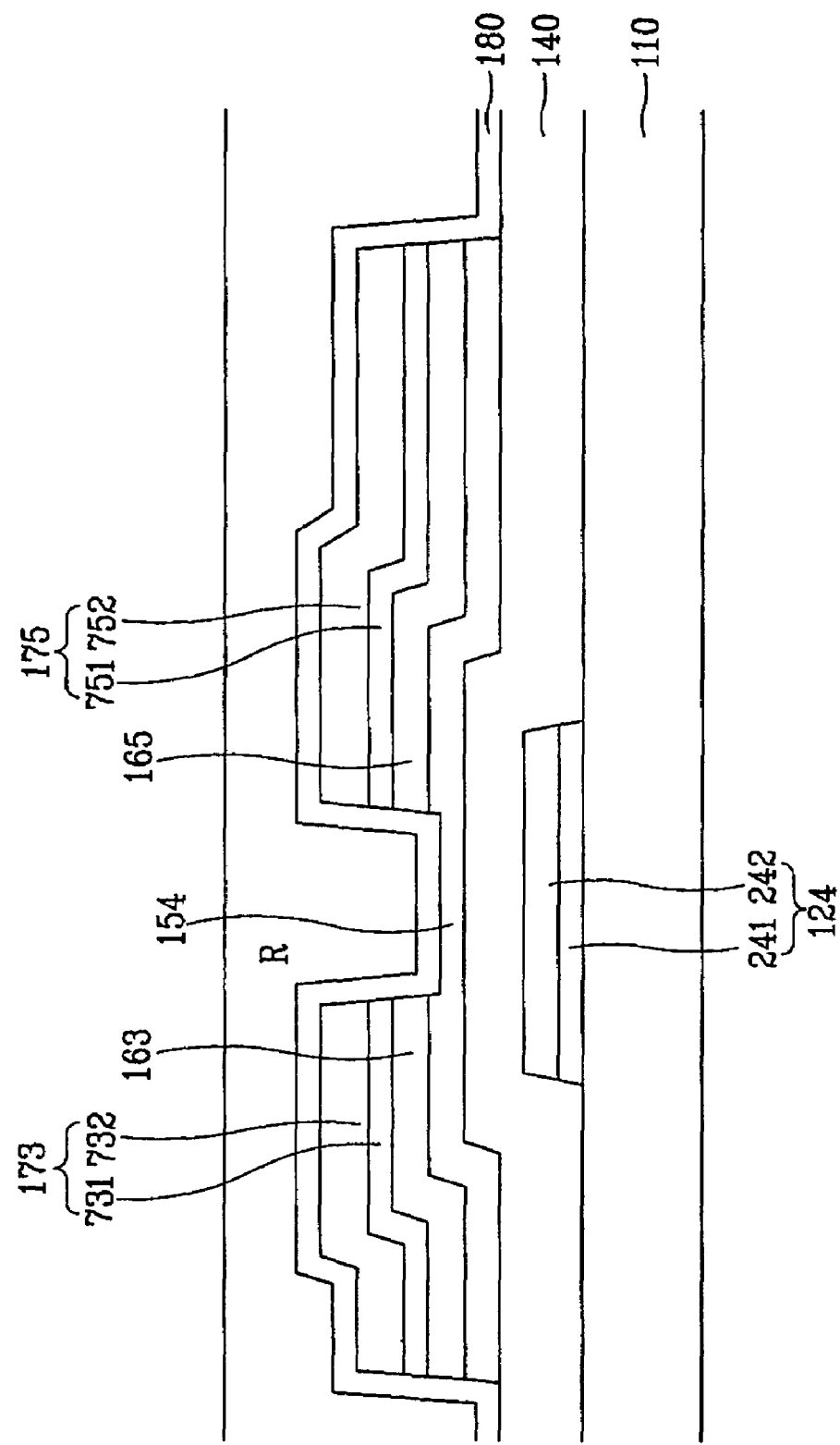

METHOD OF MANUFACTURING THIN FILM TRANSISTOR ARRAY PANEL AND LIQUID CRYSTAL DISPLAY

BACKGROUND OF THE INVENTION (a) Field of the Invention

The present invention relates to a method of manufacturing a thin film transistor array panel and a liquid crystal display.

(b) Description of Related Art

Liquid crystal displays (LCDs) are one of the most widely used flat panel displays. An LCD includes two panels having field-generating electrodes and interposing a gap therebetween, and a liquid crystal (LC) layer filled in the gap between the panels. The LCD displays images by applying voltages to the field-generating electrodes to generate an electric field in the LC layer, which determines orientations of LC molecules in the LC layer to adjust polarization of incident light.

The LCD includes a plurality of pixels arranged in a matrix and a plurality of signal lines for driving the pixels such as gate lines for transmitting scanning signals and data lines for transmitting data signals. Each pixel includes a pixel electrode, a color filter, and a thin film transistor (TFT) connected to the gate lines and the data lines for controlling the data signals.

One of the panels of the LCD called a TFT array panel includes the gate lines, the data lines, the pixel electrodes, and the TFTs and the other of the panels includes the color filters for color representation.

It is suggested that the color filters may be placed on the TFT array panel for obtaining large aperture ratio by decreasing the alignment error range between the panels.

However, the alignment of the color filters is still an issue since the misalignment yield poor display characteristics.

SUMMARY OF THE INVENTION

A method of manufacturing a thin film transistor array panel is provided, which includes: forming a gate line including a gate electrode on a substrate; depositing a gate insulating layer; forming a semiconductor layer on the gate insulating layer; forming an ohmic contact layer on the semiconductor layer; forming a data line including a source electrode and a drain electrode on the ohmic contact layer at least in part; forming an alignment key including the same layer as the data line; coating a first photosensitive film for a color filter; aligning a mask for color filter with the substrate provided with the first photosensitive film using the alignment key; forming a first color filter by light exposure and developing the first photosensitive film; and forming a pixel electrode connected to the drain electrode.

The method may further include: forming a passivation layer under the pixel electrode.

The passivation layer may be disposed on or under the color filter.

The passivation layer may include silicon nitride, silicon oxide, or organic insulator.

The method may further include: coating a second photosensitive film for a color filter; aligning the mask for color filter with the substrate provided with the second photosensitive film using the alignment key; forming a second color filter by light exposure and developing the first photosensitive film; coating a third photosensitive film for a color filter; aligning the mask for color filter with the substrate provided with the third photosensitive film using the alignment key; and forming a third color filter by light exposure and developing the first photosensitive film, wherein the first to the third color filters represent red, green, and blue colors.

Adjacent two of the first to the third color filters may overlap each other in part.

The semiconductor layer, the ohmic contact layer, the data line, and the drain electrode are formed by a single photolithography step.

A method of manufacturing a liquid crystal display is provided, which includes: forming a first panel including a gate line, a semiconductor layer, a data line, a drain electrode, an alignment key made of the same layer as the data line, and a pixel electrode connected to the data line; forming a second panel facing the first panel; aligning the first panel and the second panel using the alignment key; and combining the first panel and the second panel.

BRIEF DESCRIPTION OF THE DRAWINGS

The present invention will become more apparent by describing embodiments thereof in detail with reference to the accompanying drawings in which:

FIG. 13 is a sectional view of the TFT array panel shown in FIG. 11 taken along the lines XIII-XIII';

FIGS. 15A and 15B are sectional views of the TFT array panel shown in FIG. 14A taken along the lines XIVB-XIVB' and XIVC-XIVC', respectively, and illustrate the step following the step shown in FIGS. 14B and 14C;

FIGS. 16B and 16C are sectional views of the TFT array panel shown in FIG. 16A taken along the lines XVIB-XVIB' and XVIC-XVIC', respectively;

FIGS. 17A, 18A and 19A and FIGS. 17B, 18B and 19B are sectional views of the TFT array panel shown in FIG.

Figure 14A:
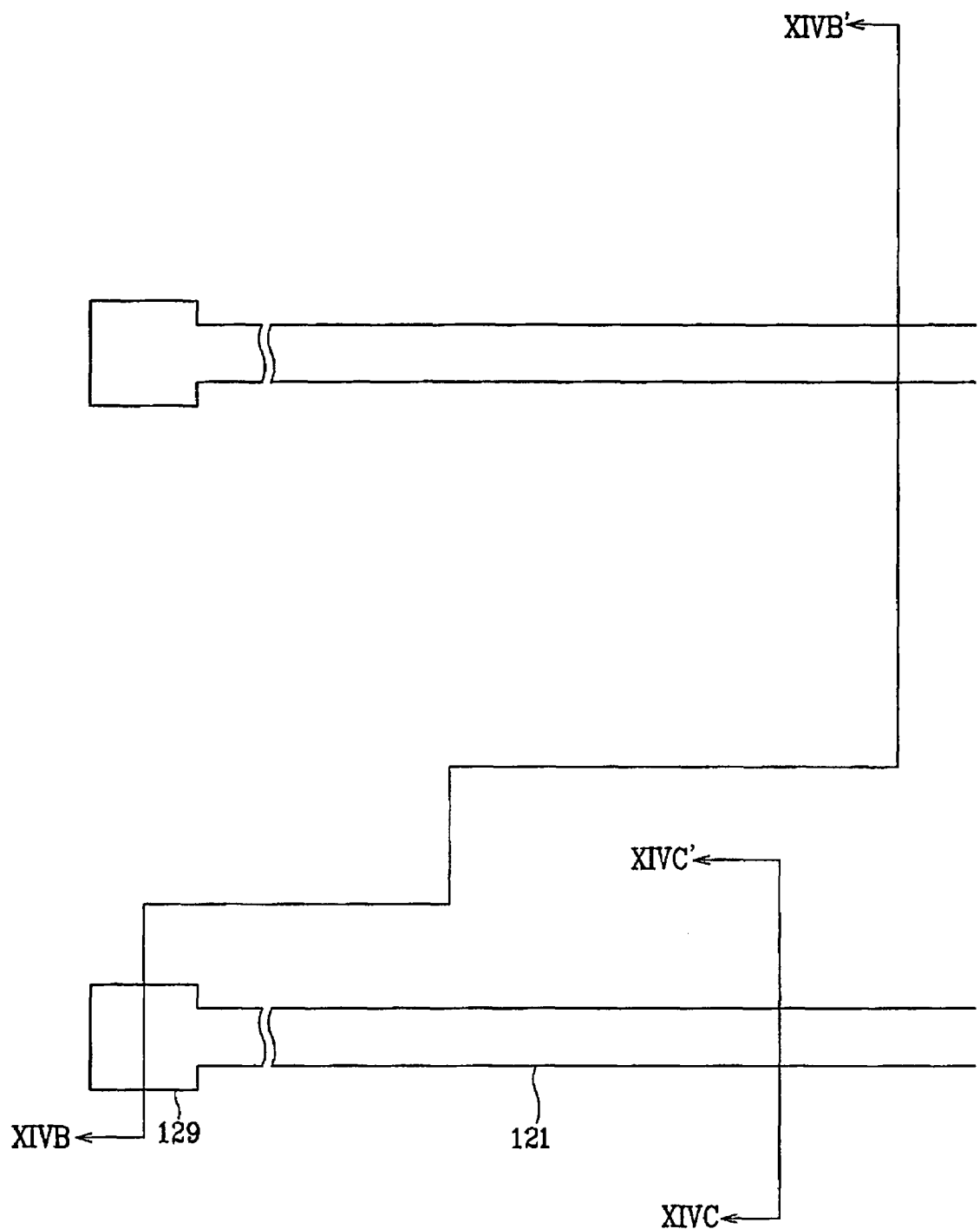
FIG. 14A is a layout view of a TFT array panel shown in FIGS. 11-13 in the first step of a manufacturing method thereof according to an embodiment of the present invention.
Figure 14B:
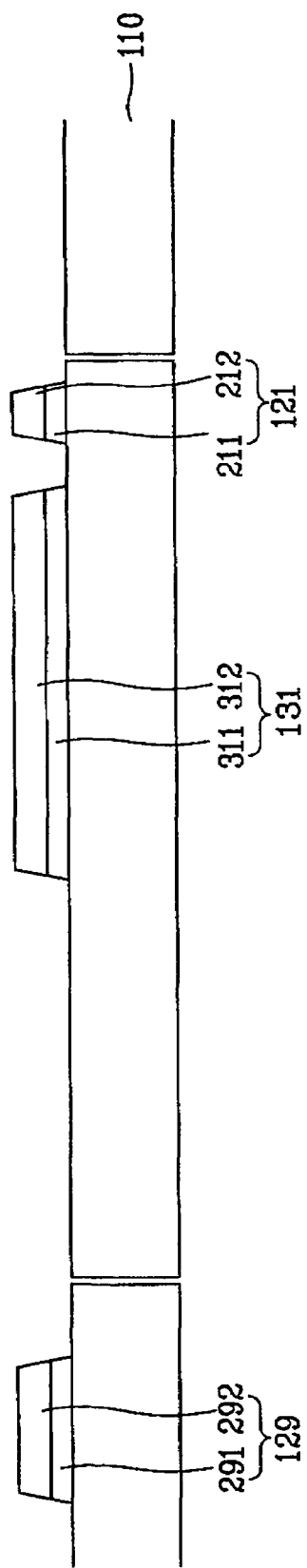
FIGS. 14B and 14C are sectional views of the TFT array panel shown in FIG. 14A taken along the lines XIVB-XIVB' and XIVC-XIVC', respectively.
Figure 14C:
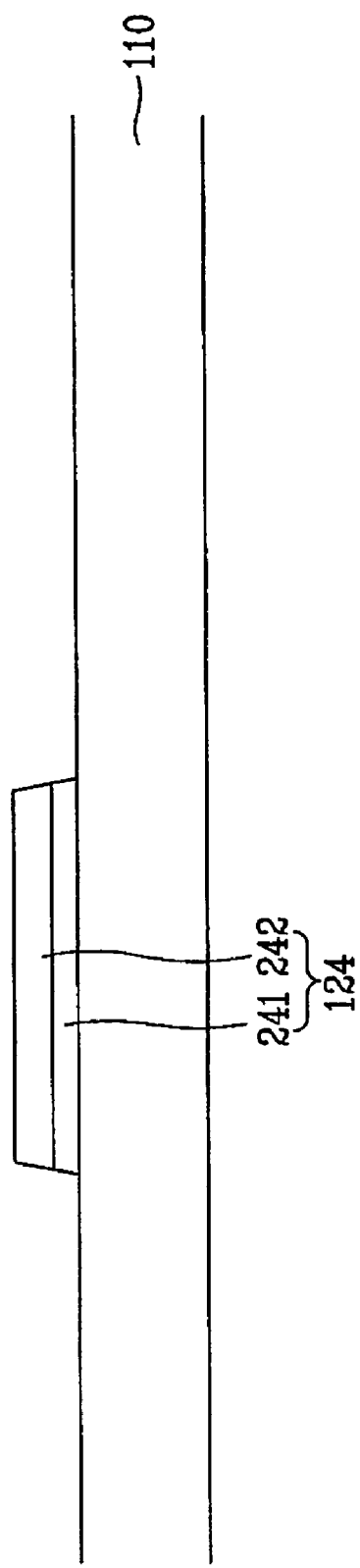
Figure 19A:
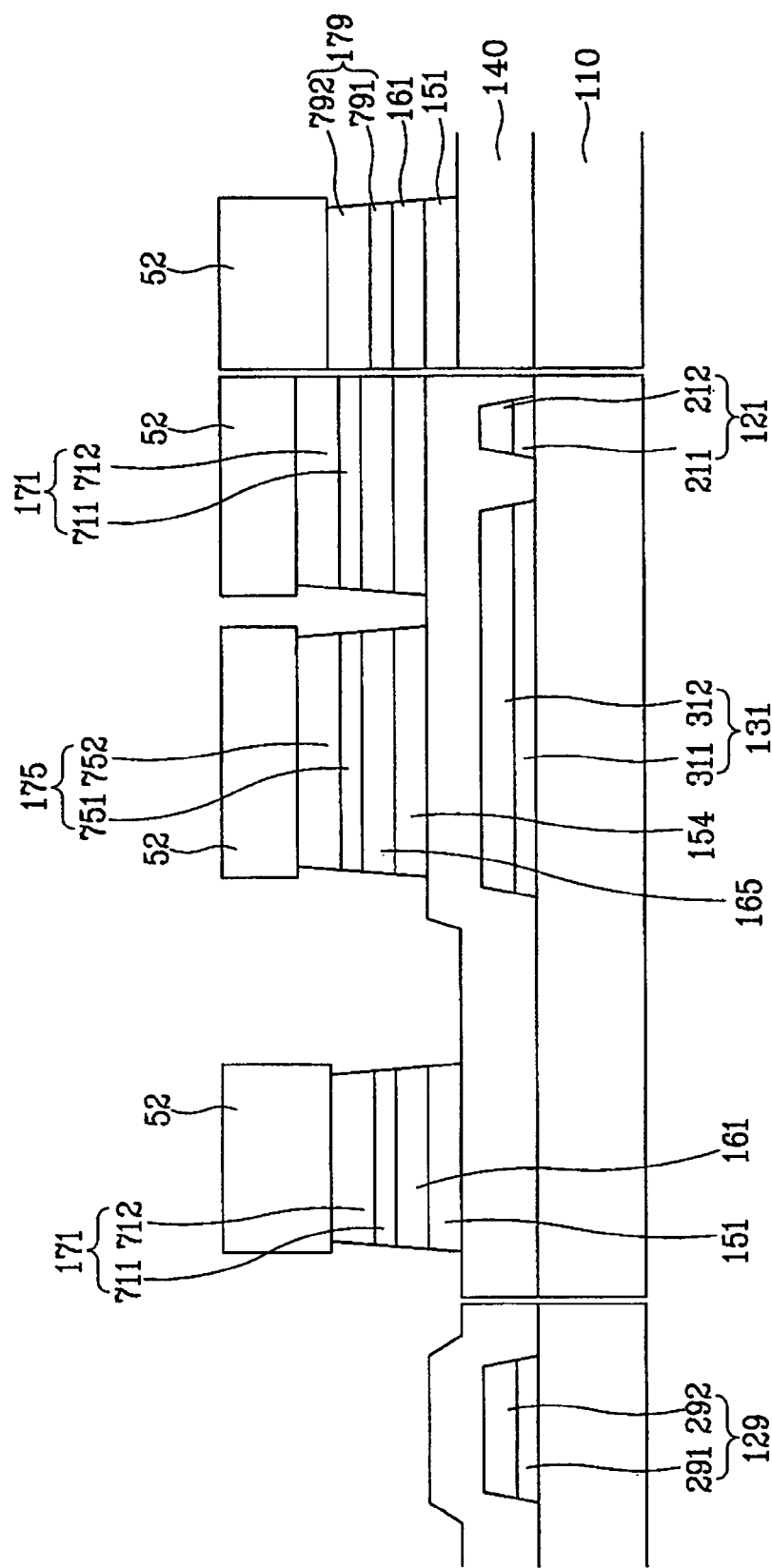
Figure 20A:
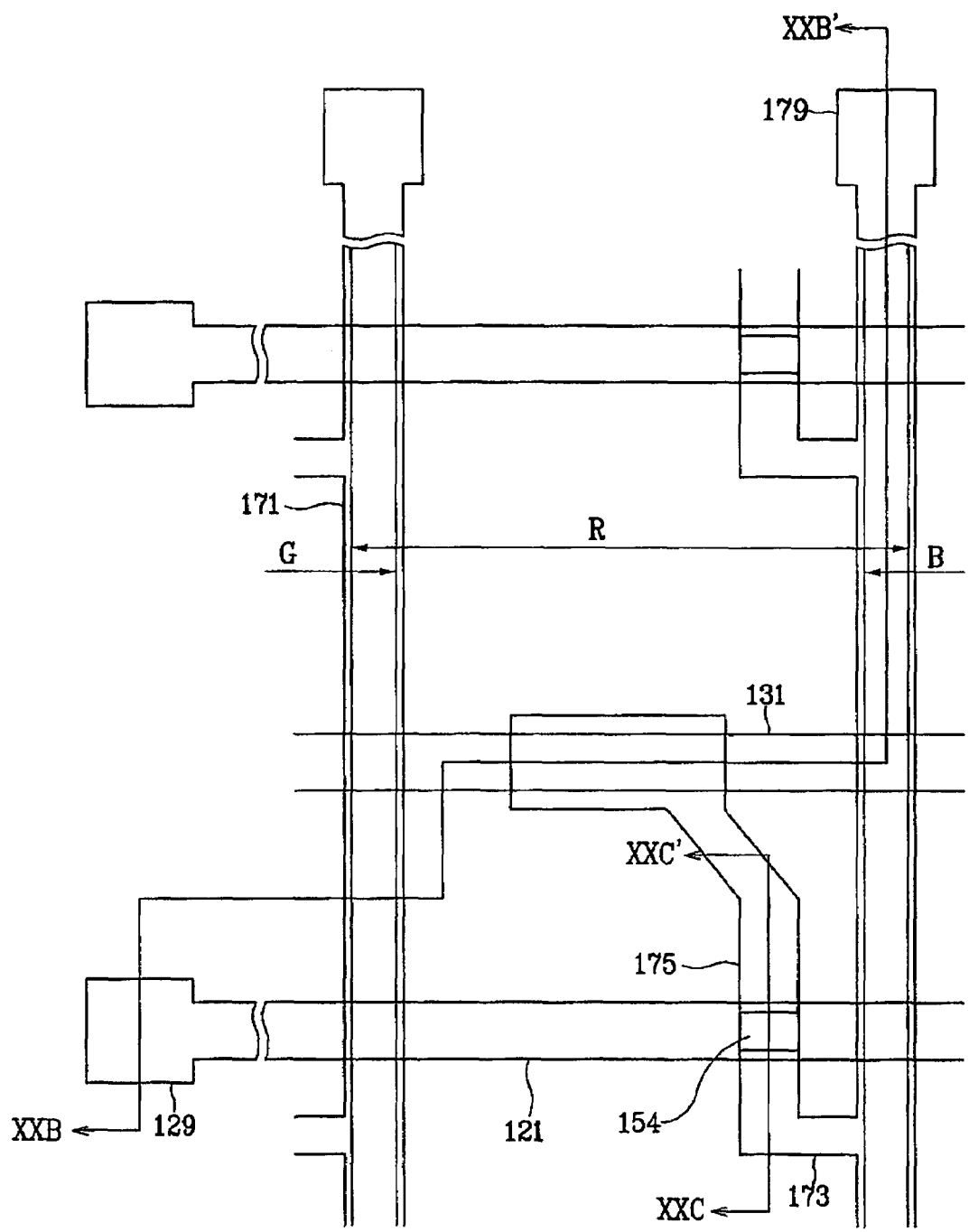
Figure 20B:
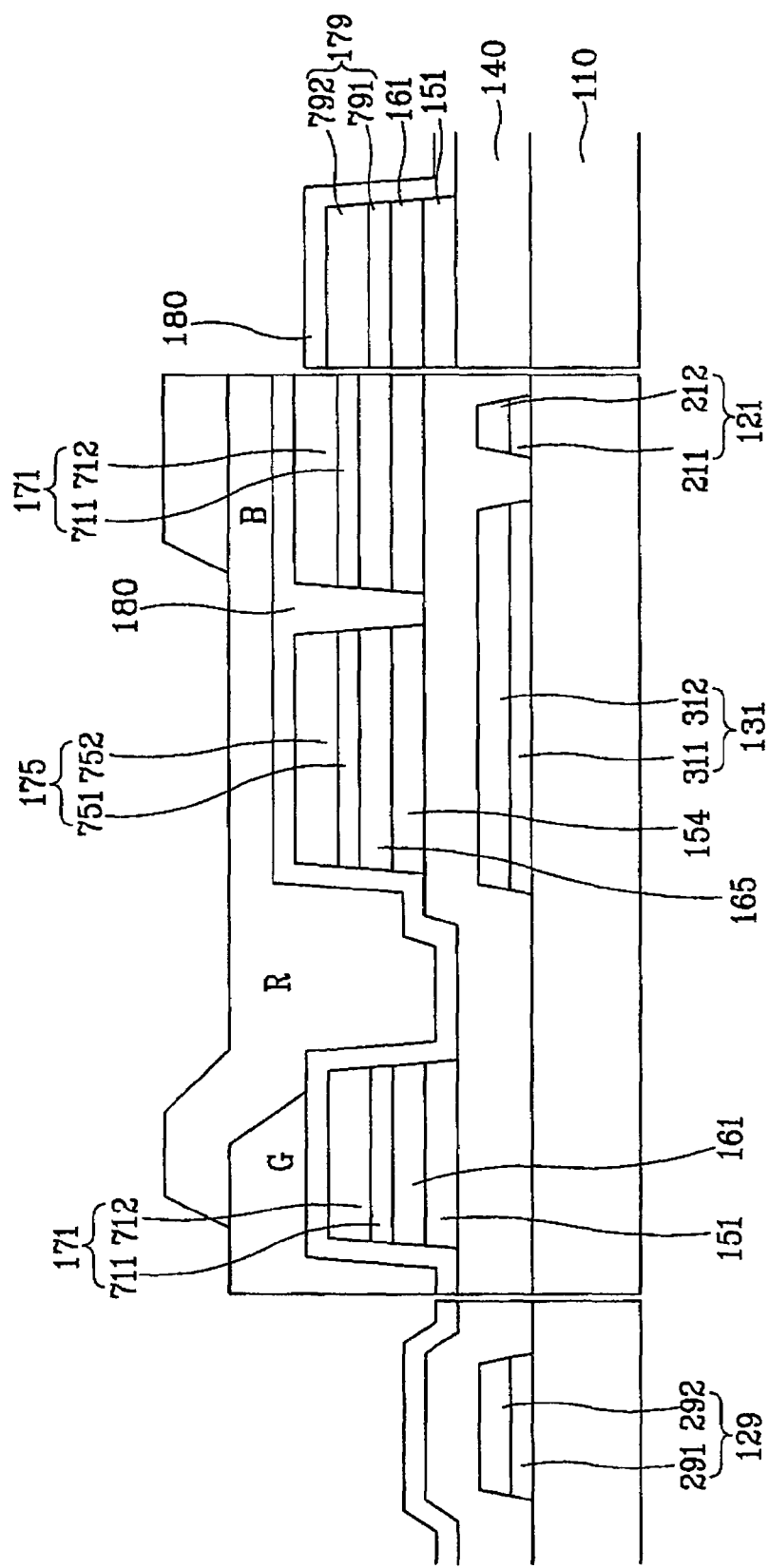
Figure 21A:
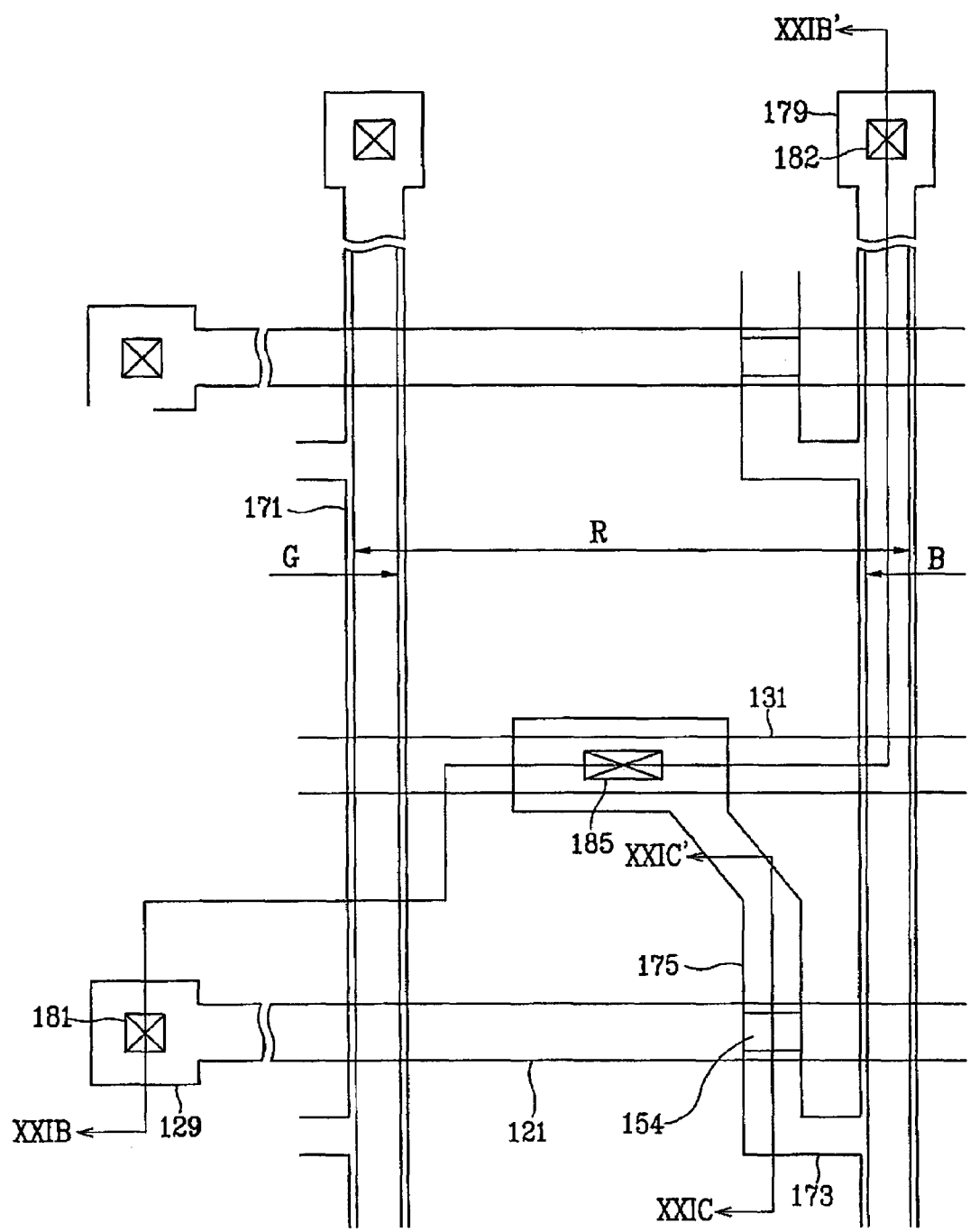
Figure 21B:
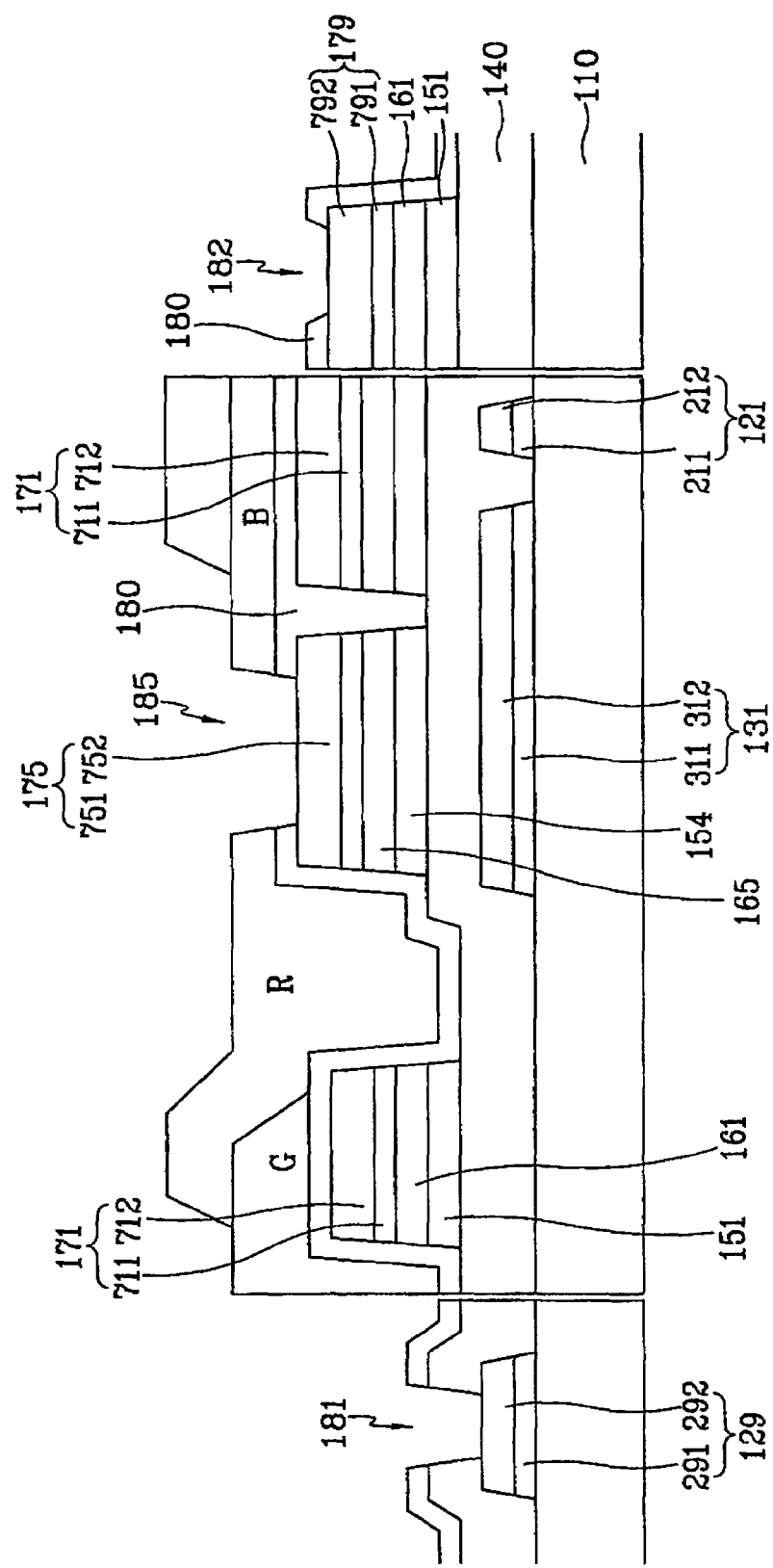

16A taken along the lines XVIB-XVIB' and XVIC-XVIC', respectively, which illustrate the step following the step shown in FIGS. 14B and 14C;

FIG. 20A is a layout view of a TFT array panel in the step following the step shown in FIGS. 19A and 19B;

FIGS. 20B and 20C are sectional views of the TFT array panel shown in FIG. 20A taken along the lines XXB-XXB' and XXC-XXC', respectively;

FIG. 21A is a layout view of a TFT array panel in the step following the step shown in FIGS. 20A-20C; and FIGS. 21B and 21C are sectional views of the TFT array panel shown in FIG. 21A taken along the lines XXIB-XXIB' and XXIC-XXIC', respectively.

Figure 22:
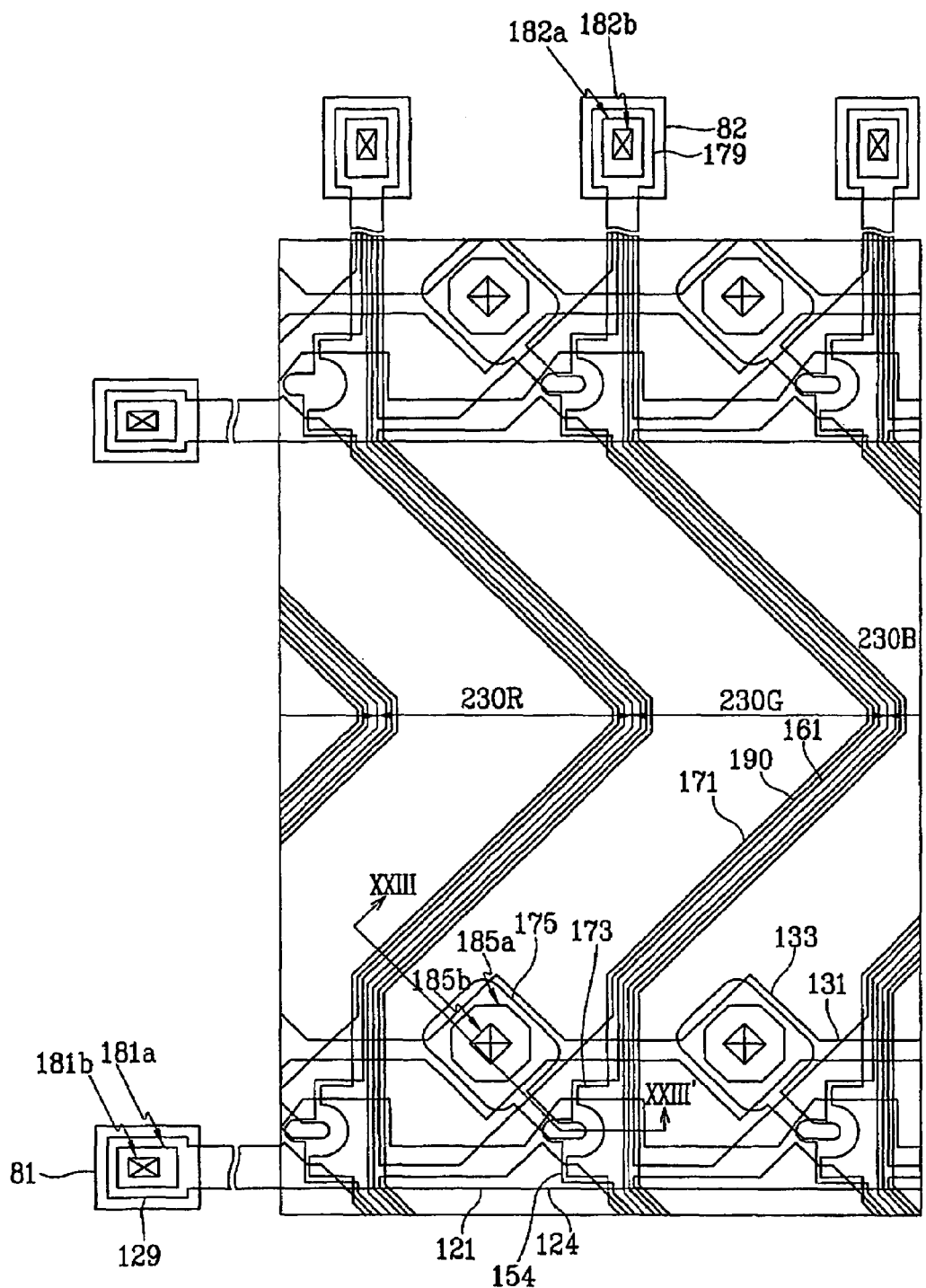
Figure 23:
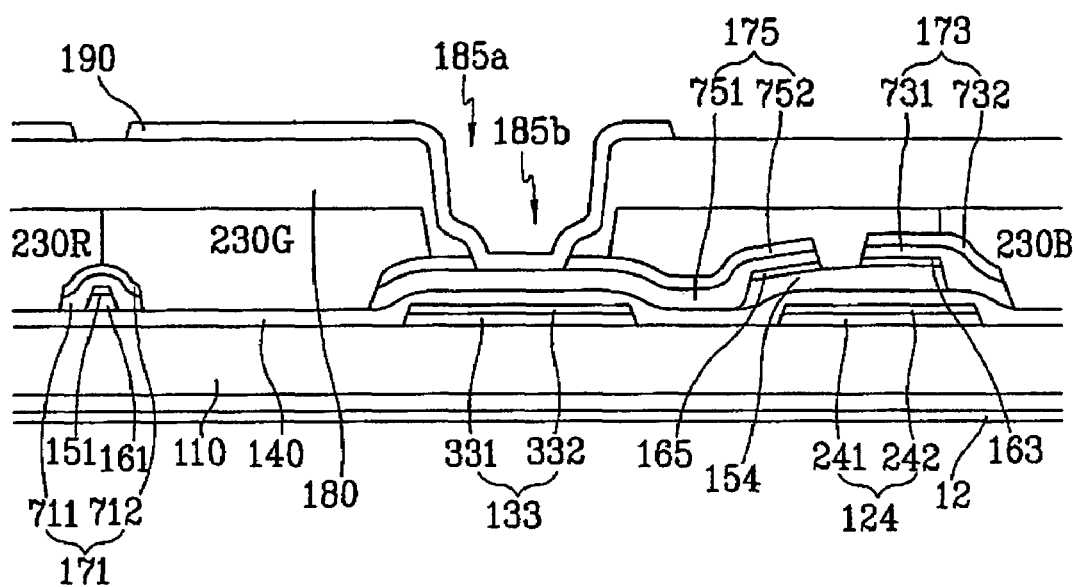

FIG. 22 is a layout view of a TFT array panel according to another embodiment of the present invention; and FIG. 23 is a sectional view of the TFT array panel shown in FIG. 22 taken along the lines XXIII-XXIII'.

DETAILED DESCRIPTION OF EMBODIMENTS

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, thin film transistor array panels and manufacturing methods thereof according to embodiments of the present invention will be described with reference to the accompanying drawings.

An LCD according to an embodiment of the present invention is described in detail with reference to FIGS. 1 and 2.

Figure 1:
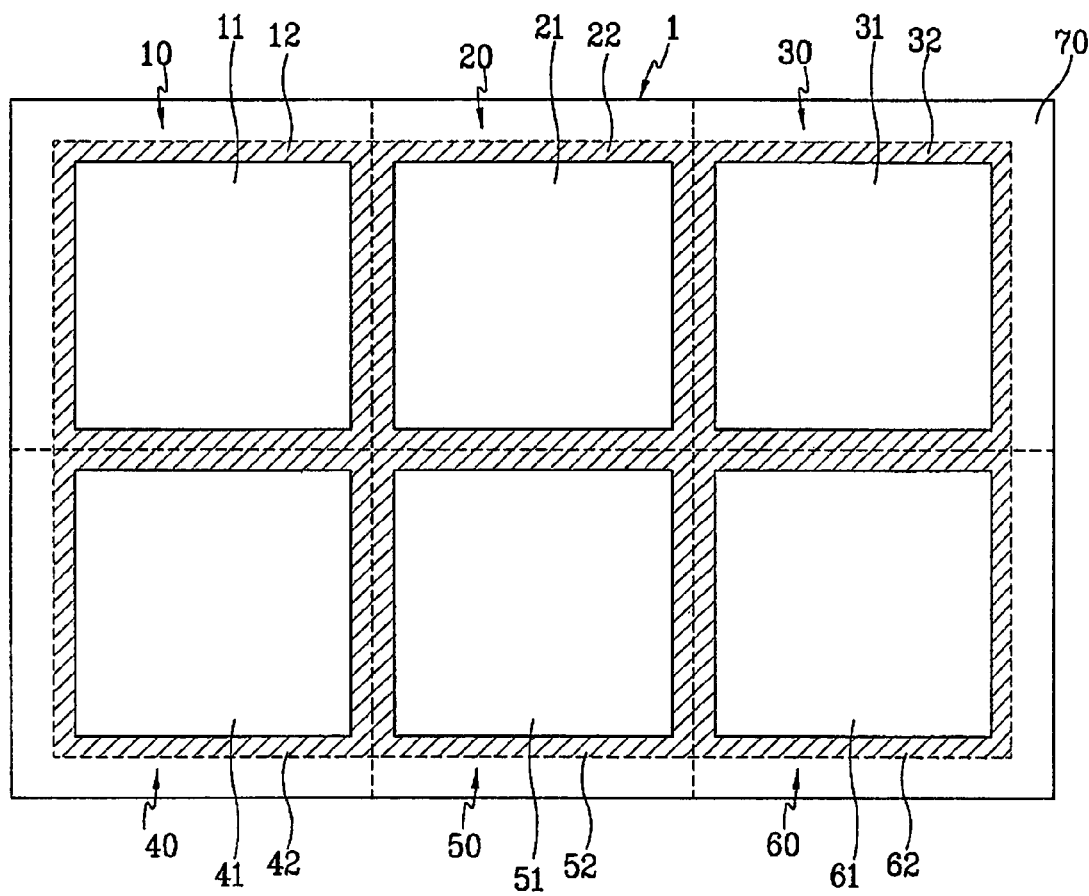
FIG. 1 is a schematic diagram of a substrate for LCDs according to an embodiment of the present invention.

FIG. 1 is a schematic diagram of a substrate for LCDs according to an embodiment of the present invention.

Referring to FIG. 1, a substrate 1 preferably made of glass includes a plurality of, for example, six device areas 10-60. When the substrate 1 is prepared for TFT array panels, each device area 10-60 includes a display area 11-61 provided with a plurality of pixel areas and a peripheral area 12-62. The display area 11-61 is provided with a plurality of TFTs, signal lines, pixel electrodes, and red, green and blue color filters, which are arranged in a matrix, and the peripheral area 12-62 is provided with elements such as pads of the signal lines, which will be connected to external driving devices, and a common voltage line for transmitting a common voltage from an external device to a common electrode.

The above-described elements of the LCD include a plurality of thin film patterns formed by several photolithography and etch steps. The patterns of the thin films are aligned with each other using alignment keys disposed on an outer area 70 of the substrate 1.

Figure 2:
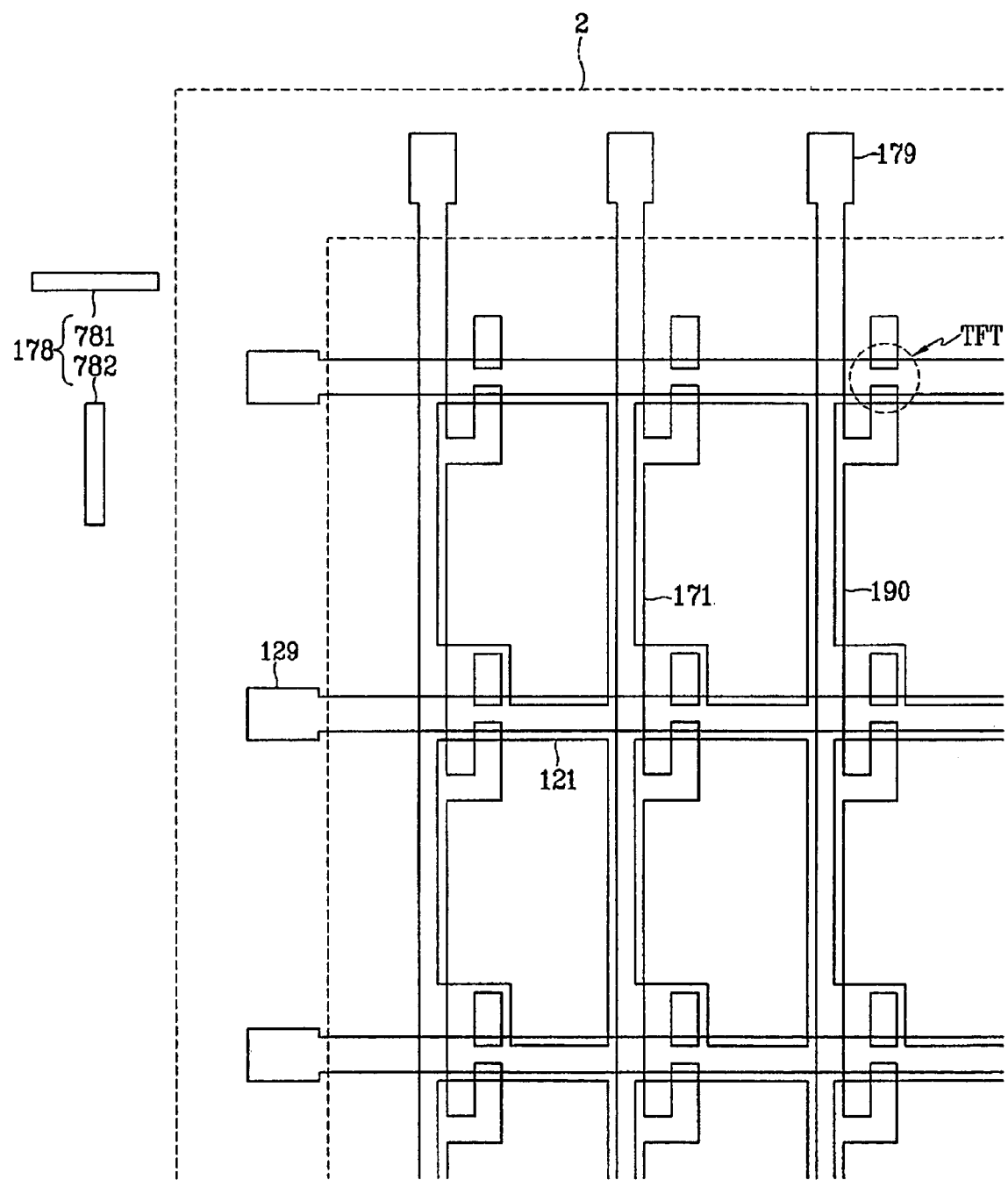
FIG. 2 is a schematic layout view of a TFT array panel for an LCD according to an embodiment of the present invention.

FIG. 2 is a schematic layout view of a TFT array panel for an LCD according to an embodiment of the present invention.

Referring to FIG. 2, a plurality of TFTs, a plurality of pixel electrodes 191 electrically connected to the TFTs, and a plurality of signal lines including mutually intersecting gate lines 121 and data lines 171 are disposed in a display area surrounded by dotted lines. In a peripheral area 2 disposed out of the display area, expansions 129 and 179 of the gate lines 121 and the data lines 179 are disposed to be connected to gate driving ICs and data driving ICs for receiving signals to be applied to the gate lines 121 and the data lines 171.

In addition, an alignment key 178 preferably made of the same layer as the data lines 171 are provided in the outer area out of the peripheral area 2. The alignment key 178 is used for aligning color filters and includes a transverse portion 781 and a longitudinal portion 782. Since the alignment key 178 is disposed out of the peripheral are, the TFT array panel after divided does not include the alignment key 178.

A TFT array panel for an LCD will be described in detail with reference to FIGS. 3 and 4.

Figure 3:
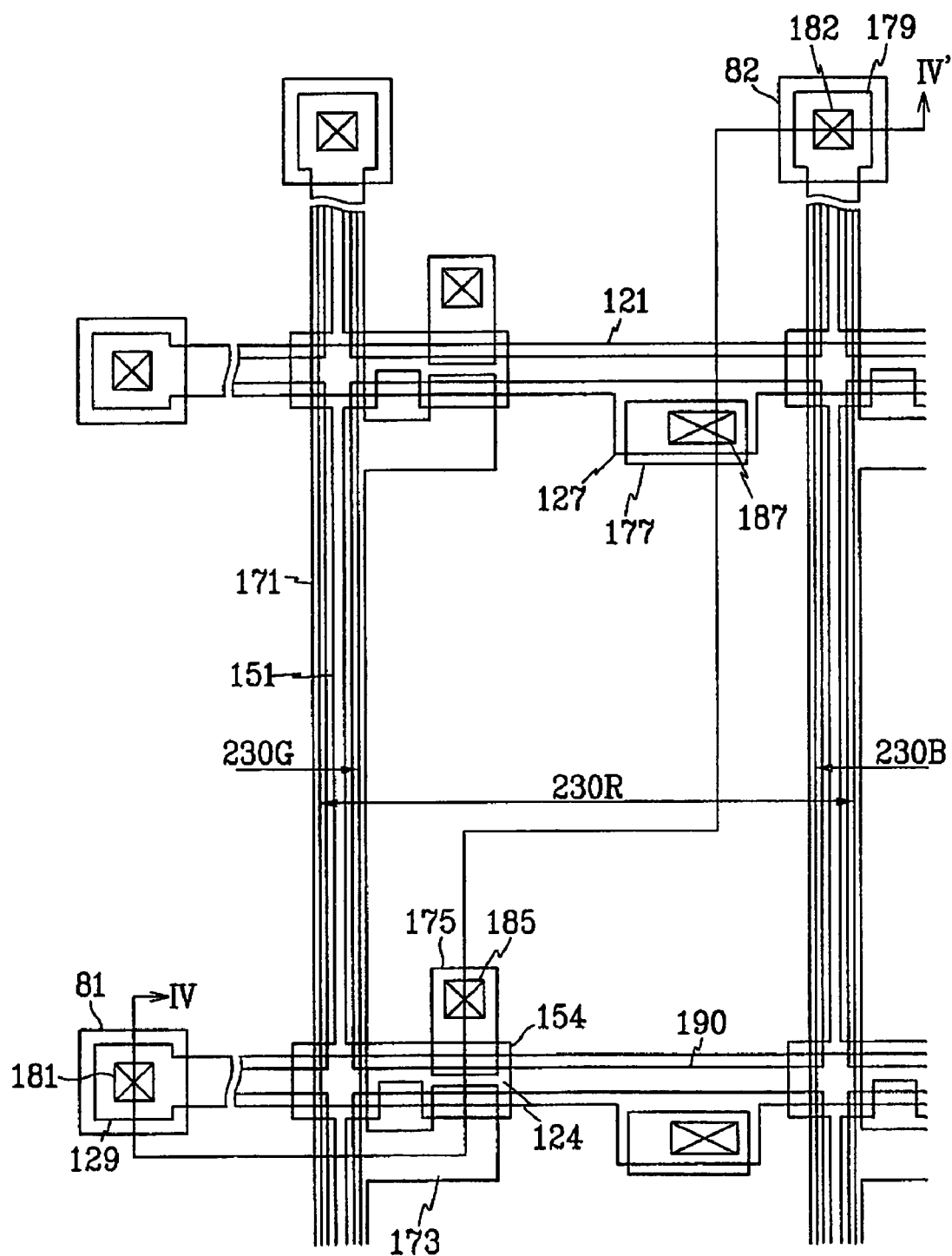
FIG. 3 is a layout view of an exemplary TFT array panel for an LCD according to an embodiment of the present invention.
Figure 4:
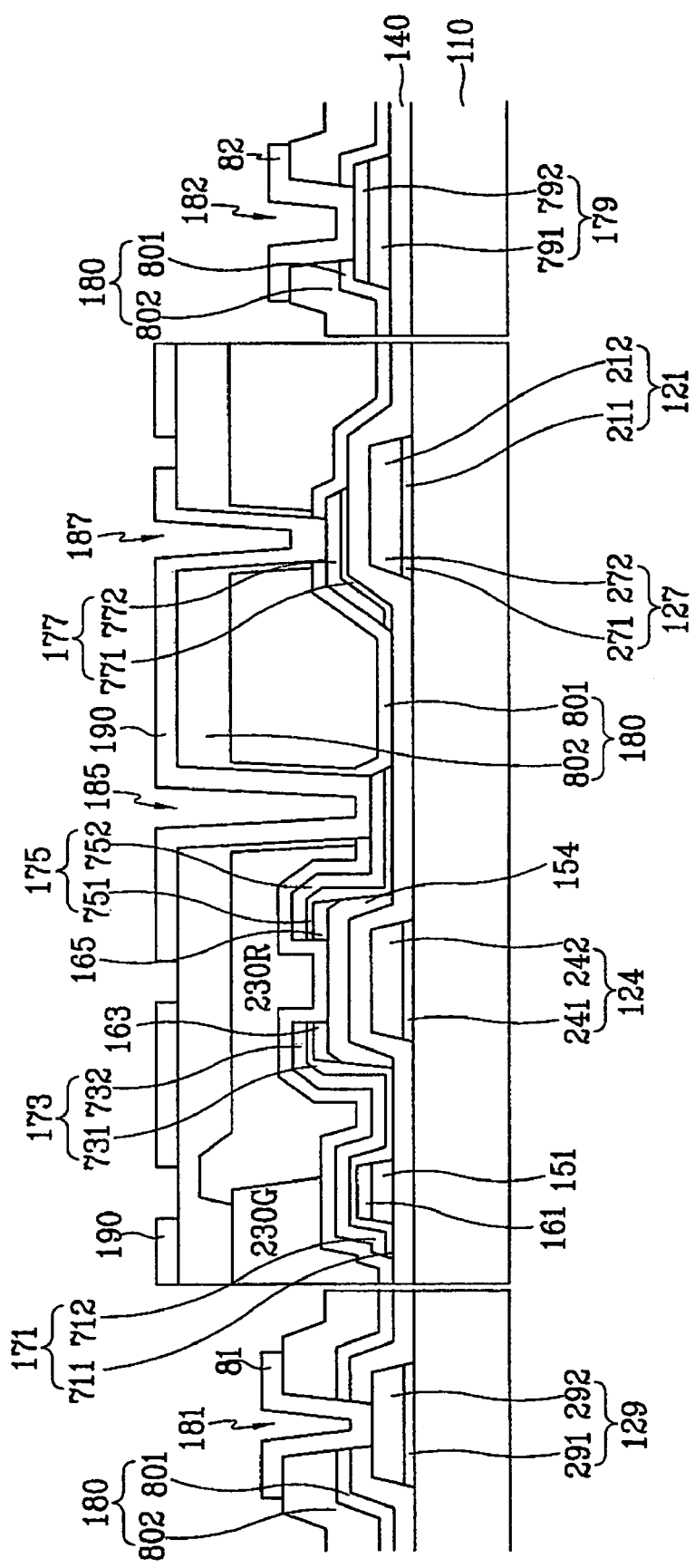
FIG. 4 is a sectional view of the TFT array panel shown in FIG. 3 taken along the line IV-IV'.

FIG. 3 is a layout view of an exemplary TFT array panel for an LCD according to an embodiment of the present invention, and FIG. 4 is a sectional view of the TFT array panel shown in FIG. 3 taken along the line IV-IV'.

A plurality of gate lines 121 for transmitting gate signals are formed on an insulating substrate 110. Each gate line 121 extends substantially in a transverse direction and a plurality of portions of each gate line 121 form a plurality of gate electrodes 124. Each gate line 121 includes a plurality of projections 127 protruding downward and an end portion 129 having a large area for contact with another layer or an external device.

The gate lines 121 include two films having different physical characteristics, a lower film 211 and an upper film 212. The lower film 211 is preferably made of low resistivity metal including Al containing metal such as Al and Al alloy, Ag containing metal such as Ag and Ag alloy, or Cu containing metal such as Cu and Cu alloy for reducing signal delay or voltage drop in the gate lines 121. On the other hand, the upper film 212 is preferably made of material such as Cr, Mo, Mo alloy, Ta and Ti, which has good physical, chemical, and electrical contact characteristics with other materials such as indium tin oxide (ITO) and indium zinc oxide (IZO). A good exemplary combination of the lower film material and the upper film material is Cr and Al—Nd alloy. In FIG. 4, the lower and the upper films of the gate electrodes 124 are indicated by reference numerals 241 and 242, respectively, the lower and the upper films of the projections 127 are indicated by reference numerals 271 and 272, respectively, and the lower and the upper films of the end portions 129 are indicated by reference numerals 291 and 292, respectively.

The gate lines 121 may have a single layer structure or may include three or more layers.

In addition, the lateral sides of the upper film 212 and the lower film 211 are inclined relative to a surface of the substrate 110, and the inclination angle thereof ranges about 30-80 degrees.

A gate insulating layer 140 preferably made of silicon nitride (SiNx) is formed on the gate lines 121.

A plurality of semiconductor stripes 151 preferably made of hydrogenated amorphous silicon (abbreviated to "a-Si") or polysilicon are formed on the gate insulating layer 140. Each semiconductor stripe 151 extends substantially in a longitudinal direction and has a plurality of projections 154 branched out toward the gate electrodes 124. The width of each semiconductor stripe 151 becomes large near the gate lines 121 such that the semiconductor stripe 151 covers large areas of the gate lines 121.

A plurality of ohmic contact stripes and islands 161 and 165 preferably made of silicide or n+hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range between about 30-80 degrees.

A plurality of data lines 171, a plurality of drain electrodes 175, and a plurality of storage capacitor conductors 177 are formed on the ohmic contacts 161 and 165 and the gate insulating layer 140.

The data lines 171 for transmitting data voltages extend substantially in the longitudinal direction and intersect the gate lines 121. Each data line 171 includes a plurality of branches projecting toward the drain electrodes 175 to form a plurality of source electrodes 173 and it has an end portion 179 having a large area for contact with another layer or an external device. Each pair of the source electrodes 173 and the drain electrodes 175 are separated from each other and opposite each other with respect to a gate electrode 124. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The storage capacitor conductors 177 overlap the projections 127 of the gate lines 121.

The data lines 171, the drain electrodes 175, and the storage capacitor conductors 177 also include a lower film 711, 751 and 771 preferably made of Al containing metal, Ag containing metal, or Cu containing metal and an upper film 712, 752 and 772 located thereon and preferably made of Cr, Mo, Mo alloy, Ta or Ti. Each data line 171 includes an end portion 179 having a larger area for contact with another layer or an external device.

Like the gate lines 121, the lower film 711, 751 and 771 and the upper film 712, 752 and 772 of the data lines 171, the drain electrodes 175, and the storage capacitor conductors 177 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines as described above, to smooth the profile of the surface, thereby preventing the disconnection of the data lines 171.

A first passivation layer 801 preferably made of silicon nitride or silicon oxide is formed on the data lines 171, the drain electrodes 175, the storage conductors 177, and the exposed portions of the semiconductor stripes 151.

A plurality of red, green and blue color filter stripes 230R, 230G and 230B are formed on the first passivation layer 801. Each of the color filter stripes 230R, 230G and 230B are disposed substantially between adjacent two the data lines 171 and extends in a longitudinal direction. The color filter stripes 230R, 230G and 230B are not disposed on a peripheral area which is provided with the end portions 179 of the data lines 171. The color filter stripes 230R, 230G and 230B have a plurality of openings placed on the drain electrodes 175 and the storage capacitor conductors 177 and having tapered sidewalls. Edges of adjacent color filter stripes 230R, 230G and 230B exactly match with each other. However, the edges may overlap to block the light leakage between the pixel areas, and the edges may be tapered or thinner than other portions for improving step coverage of overlying layers and for planarizing a surface to prevent misalignment of the LC molecules. It is preferable that the overlapping portions fully cover the data lines 171.

A second passivation layer 802 is formed on the adjacent color filter stripes R, G and B. The second passivation layer 802 is preferably made of photosensitive organic material having a good flatness characteristic or low dielectric insulating material such as a-Si:C:O and a-Si:O:F formed by plasma enhanced chemical vapor deposition (PECVD).

The passivation layers 180 have a plurality of contact holes 182, 185 and 187 exposing the end portions 179 of the data lines 171, the drain electrodes 175, and the storage conductors 177, respectively. In addition, the passivation layers 180 and the gate insulating layer 140 have a plurality of contact holes 181 exposing the end portions 129 of the gate lines 121. The contact holes 181, 182, 185 and 187 have inclined sidewalls and the contact holes 185 and 187 are disposed within the openings of the color filter stripes 230R, 230G and 230B. Accordingly, boundaries of the first and the second passivation layers 180 at the contact holes 181, 182, 185 and 187 coincide with each other. However, the contact holes 185 and 187 may expose a top surface of the color filter stripes 230R, 230G and 230B to have stepped profiles.

A plurality of pixel electrodes 190 and a plurality of contact assistants 81 and 82, which are preferably made of ITO or IZO, are formed on the passivation layers 180.

The pixel electrodes 190 are physically and electrically connected to the drain electrodes 175 through the contact holes 185 and to the storage capacitor conductors 177 through the contact holes 187 such that the pixel electrodes 190 receive the data voltages from the drain electrodes 175 and transmit the received data voltages to the storage capacitor conductors 177.

The pixel electrodes 190 supplied with the data voltages generate electric fields in cooperation with a common electrode 270 on another panel 200, which reorient liquid crystal molecules in the liquid crystal layer disposed therebetween.

A pixel electrode 190 and a common electrode 270 form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the gate lines 121 adjacent thereto (called "previous gate lines"). The capacitances of the storage capacitors, i.e., the storage capacitances are increased by providing the projections 127 at the gate lines 121 for increasing overlapping areas and by providing the storage capacitor conductors 177, which are connected to the pixel electrodes 190 and overlap the projections 127, under the pixel electrodes 190 for decreasing the distance between the terminals.

The pixel electrodes 190 overlap the gate lines 121 and the data lines 171 to increase aperture ratio but it is optional.

The contact assistants 81 and 82 are connected to the exposed end portions 129 of the gate lines 121 and the exposed end portions 179 of the data lines 171 through the contact holes 181 and 182, respectively. The contact assistants 81 and 82 protect the exposed portions 129 and 179 and complement the adhesion between the exposed portions 129 and 179 and external devices.

According to another embodiment of the present invention, the pixel electrodes 190 are made of transparent conductive polymer. For a reflective LCD, the pixel electrodes 190 are made of opaque reflective metal. In these cases, the contact assistants 81 and 82 may be made of material such as ITO or IZO different from the pixel electrodes 190.

A method of manufacturing the TFT array panel shown in FIGS. 3 and 4 according to an embodiment of the present invention will be now described in detail with reference to FIGS. 5A to 10B as well as FIGS. 3 and 4.

FIGS. 5A, 6A, 7A, 9A and 10A are layout views of the TFT array panel shown in FIGS. 3 and 4 in intermediate steps of a manufacturing method thereof according to an embodiment of the present invention, and FIGS. 5B, 6B, 7B, 9B and 10B are sectional views of the TFT array panel shown in FIGS. 6A, 7A, 9A and 10A taken along the lines VB-VB', VIB-VIB', VIIB-VIIB', IX-IX', and X-X', respectively. FIG. 8 is a layout view of an alignment key for color filter stripes on the TFT array panel and an alignment key for color filter stripes on a mask.

Two conductive films, a lower conductive film and an upper conductive film are sputtered in sequence on an insulating substrate 110 such as transparent glass. The lower conductive film is preferably made of a metal such as Cr, Mo, and Mo alloy including MoW, which has good contact characteristics with ITO or IZO, and it has a thickness of about 500 Å. The upper conductive film is preferably made of Al containing metal and preferably has a thickness of about 2,500 Å.

Figure 5A:
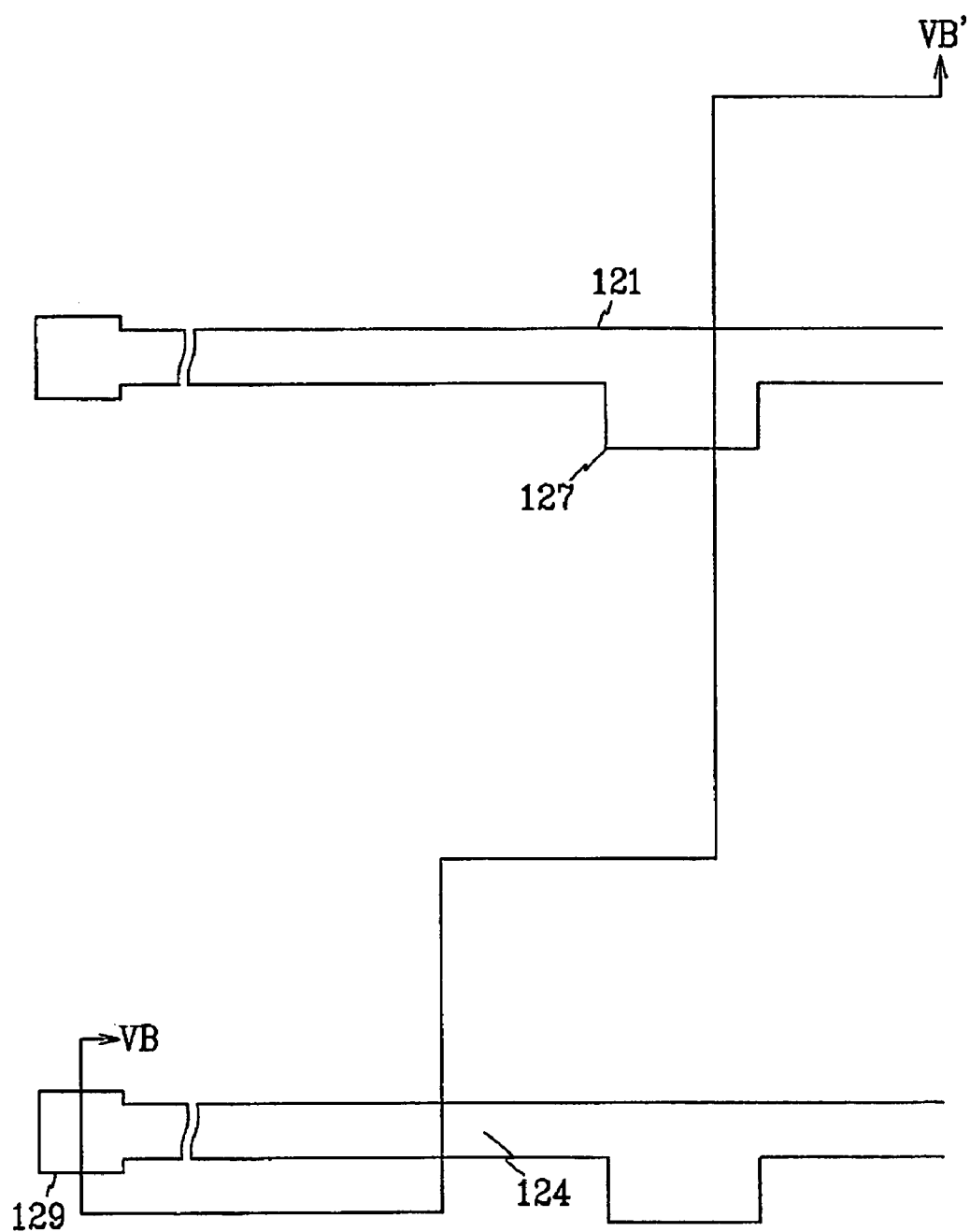
FIGS. 5A, 6A, 7A, 9A and 10A are layout views of the TFT array panel shown in FIGS. 3 and 4 in intermediate steps of a manufacturing method thereof according to an embodiment of the present invention.
Figure 5B:
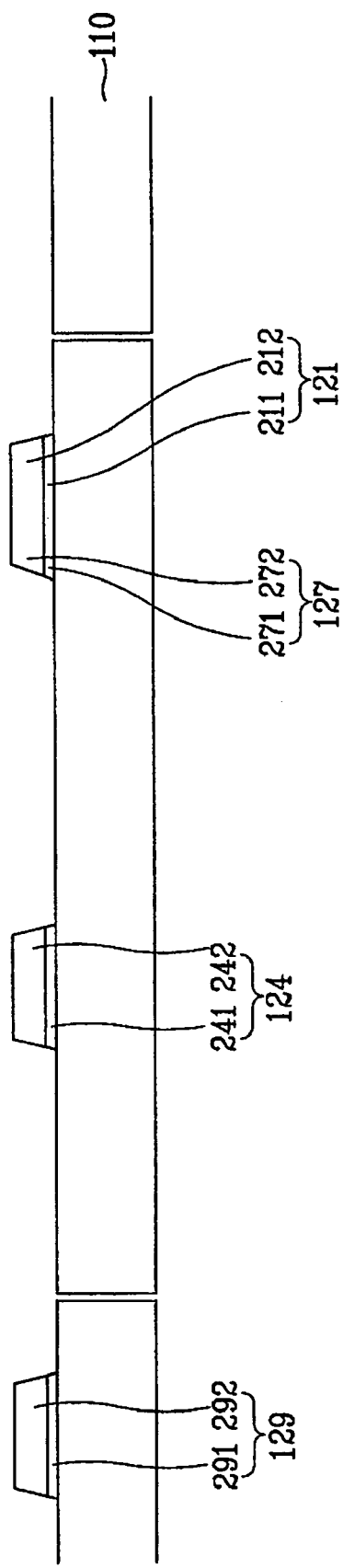
FIGS. 5B, 6B, 7B, 9B and 10B are sectional views of the TFT array panel shown in FIGS. 6A, 7A, 9A and 10A taken along the lines VB-VB', VIB-VIB', VIIB-VIIB', IX-IX', and X-X', respectively.

Referring to FIGS. 5A and 5B, the upper conductive film and the lower conductive film are patterned in sequence by photo-etching with a photoresist pattern to form a plurality of gate lines 121 including a plurality of gate electrodes 124 and a plurality of projections 127. Although the lower and the upper films 211 and 212 may be separately etched under different conditions, they may be simultaneously etched preferably using an Al etchant including 8-15% $CH_3COOH$, 5-8% $HNO_3$, 50-60% $H_3PO_4$, and remaining $H_2O$, which can etch both Al and Mo with giving inclined etch profiles.

Figure 6A:
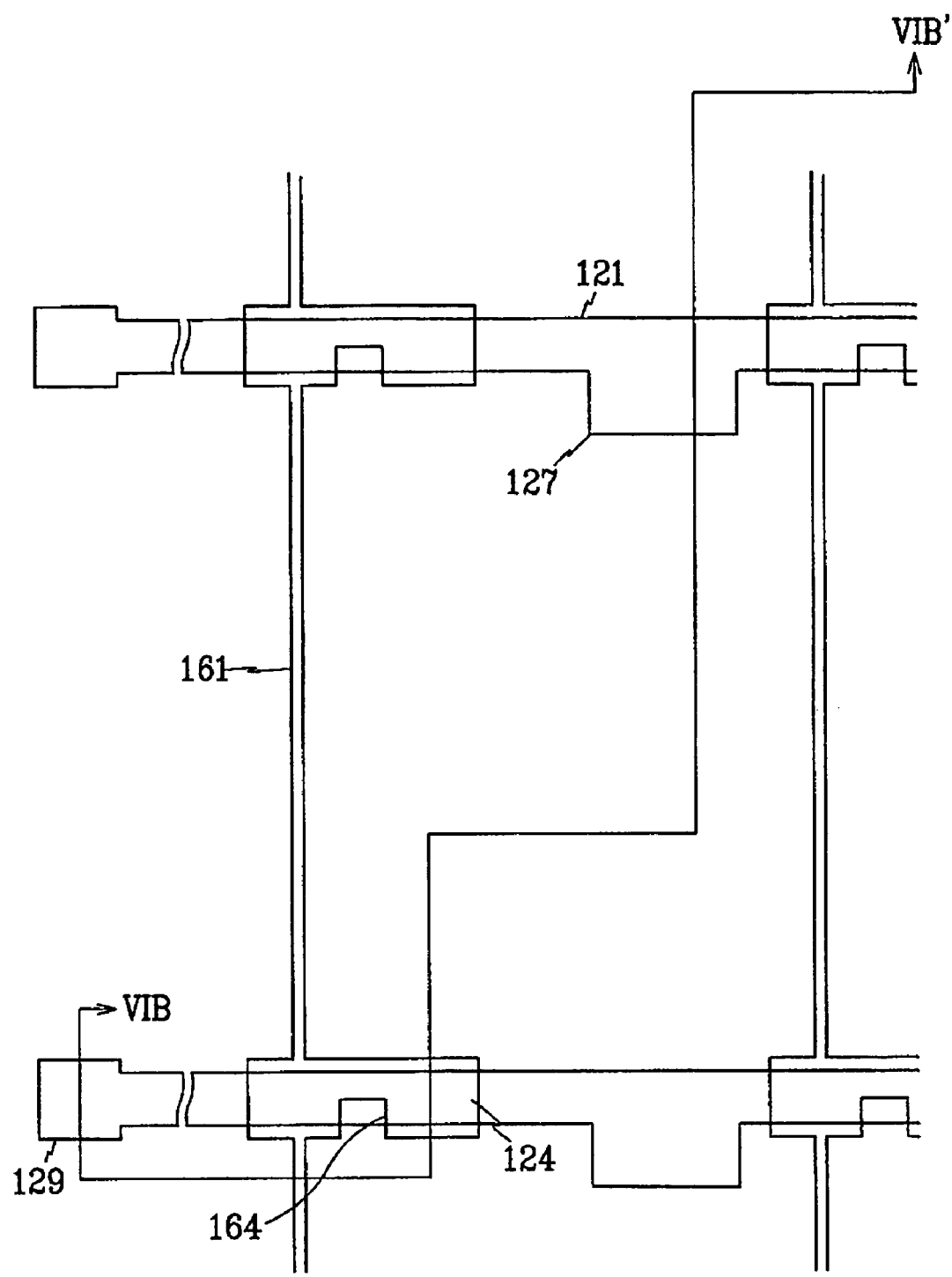
Figure 6B:
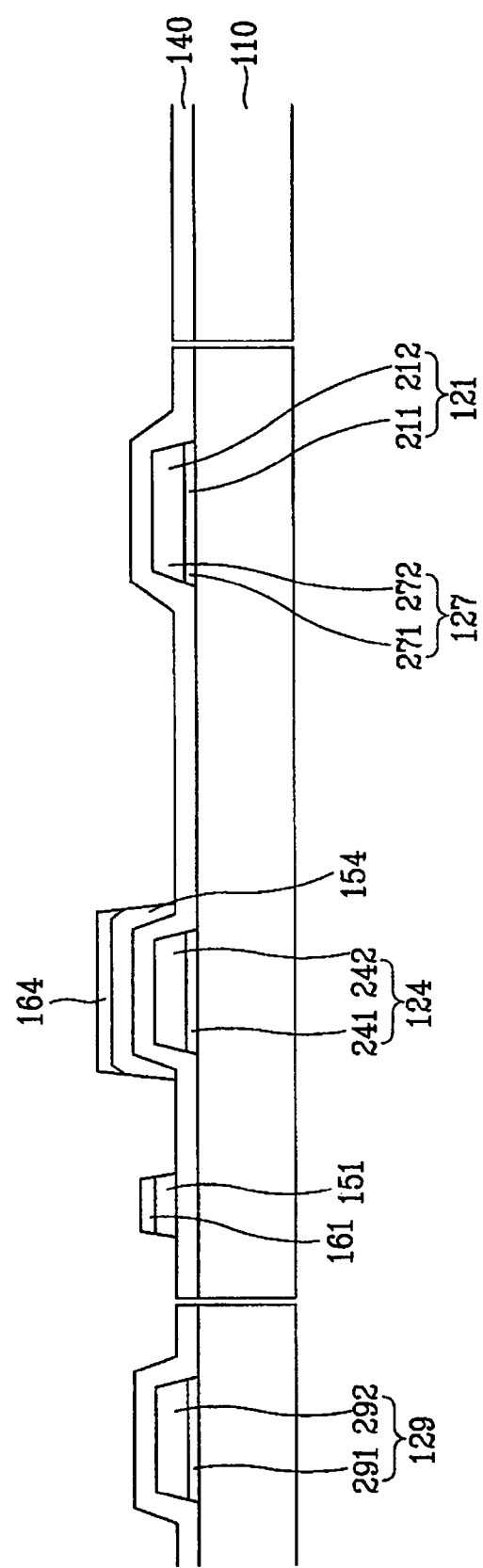

Referring to FIGS. 6A and 6B, after sequential deposition of a gate insulating layer 140, an intrinsic a-Si layer, and an extrinsic a-Si layer, the extrinsic a-Si layer and the intrinsic a-Si layer are photo-etched to form a plurality of extrinsic semiconductor stripes 164 and a plurality of intrinsic semiconductor stripes 151 including a plurality of projections 154 on the gate insulating layer 140. The gate insulating layer 140 is preferably made of silicon nitride with thickness of about 2,000 Å to about 5,000 Å, and the deposition temperature is preferably in a range between about 250° C. and about 500° C.

Figure 7A:
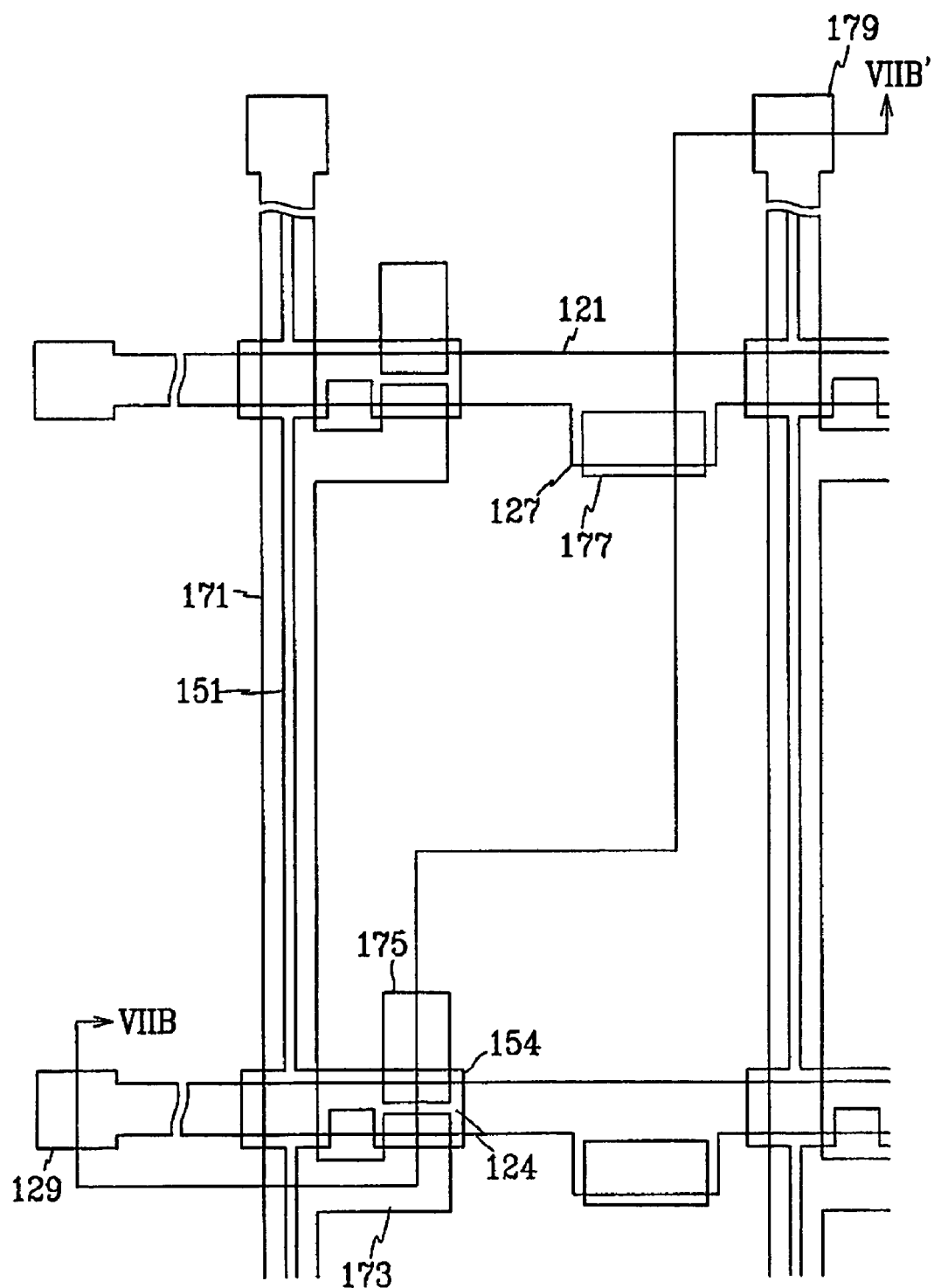
Figure 7B:
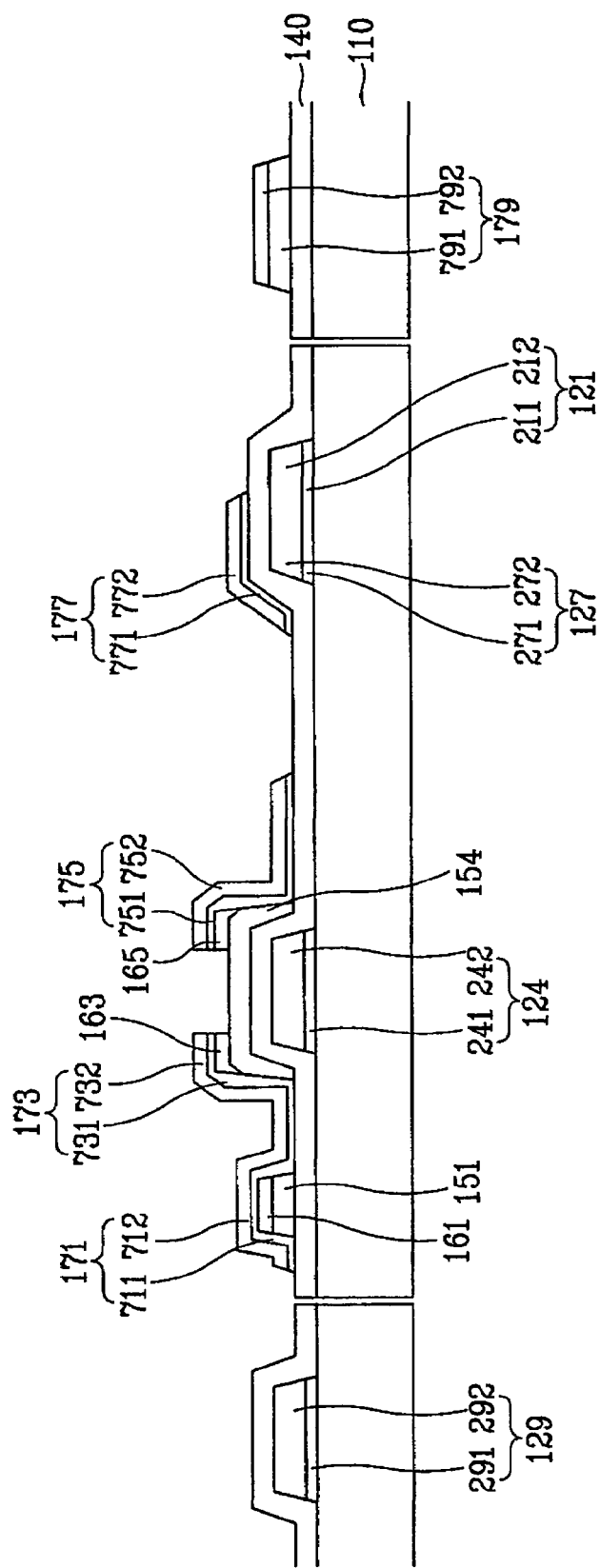
Figure 8:
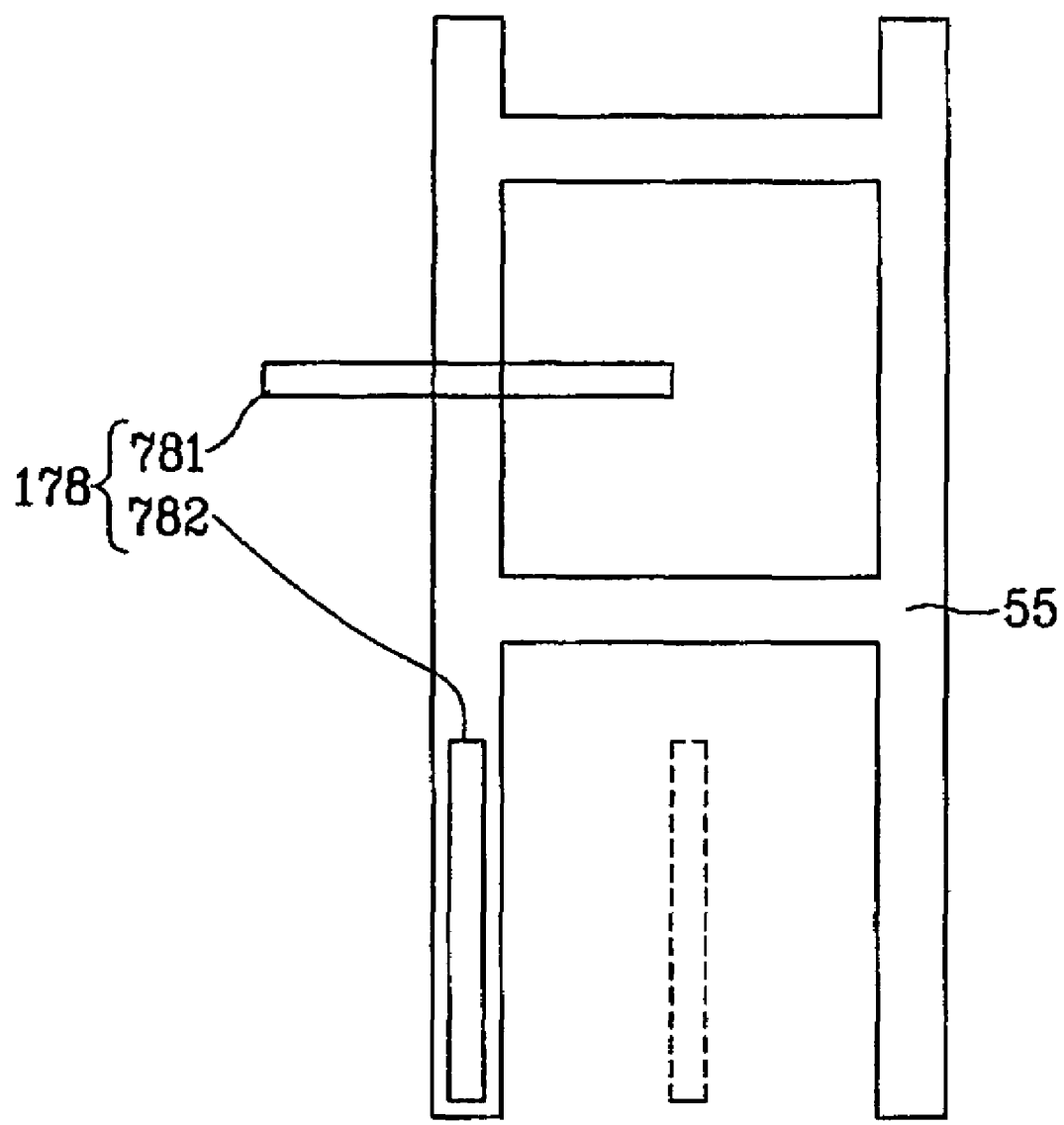
FIG. 8 is a layout view of an alignment key for color filter stripes on the TFT array panel and an alignment key for color filter stripes on a mask.

Referring to FIGS. 7A and 7B, a conductive layer including a lower conductive film and an upper conductive film is sputtered and etched to form a plurality of data lines 171 including a plurality of source electrodes 173, a plurality of drain electrodes 175, a plurality of storage capacitor conductors 177, and an alignment key 178 including a longitudinal portion 781 and a transverse portion 782 for aligning color filter stripes (shown in FIG. 8). The lower conductive film is preferably made of a metal such as Cr, Mo, and Mo alloy including MoW, which has good contact characteristics with ITO or IZO, and it has a thickness of about 500 Å. The upper conductive film is preferably made of Al containing metal and preferably has a thickness of about 2,500 Å.

Thereafter, portions of the extrinsic semiconductor stripes 164, which are not covered with the data lines 171, the drain electrodes 175, and the storage capacitor conductors 177, are removed to complete a plurality of ohmic contact stripes 161 including a plurality of projections 163 and a plurality of ohmic contact islands 165 and to expose portions of the intrinsic semiconductor stripes 151. Oxygen plasma treatment preferably follows thereafter in order to stabilize the exposed surfaces of the semiconductor stripes 151.

Figure 9A:
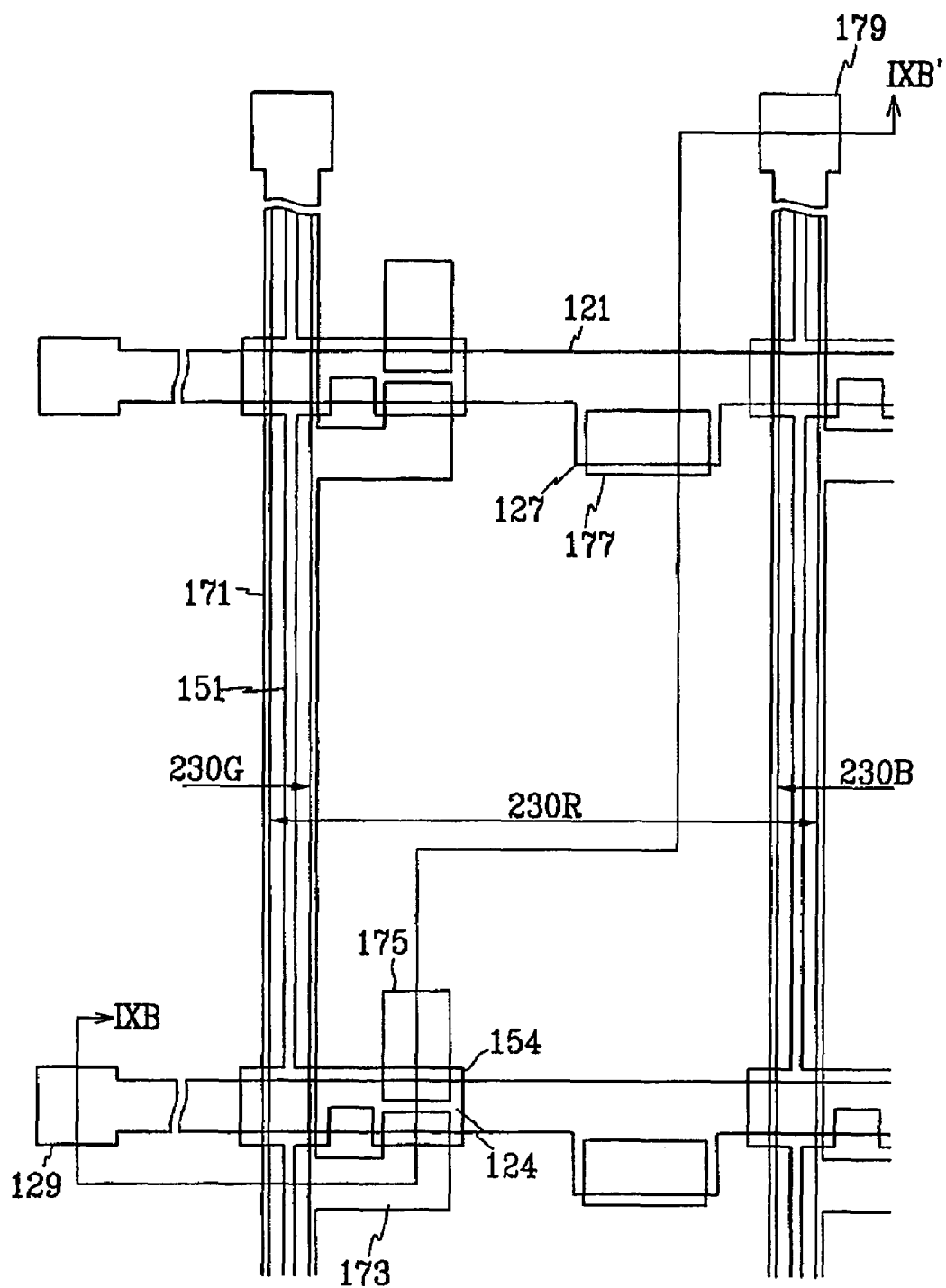
Figure 9B:
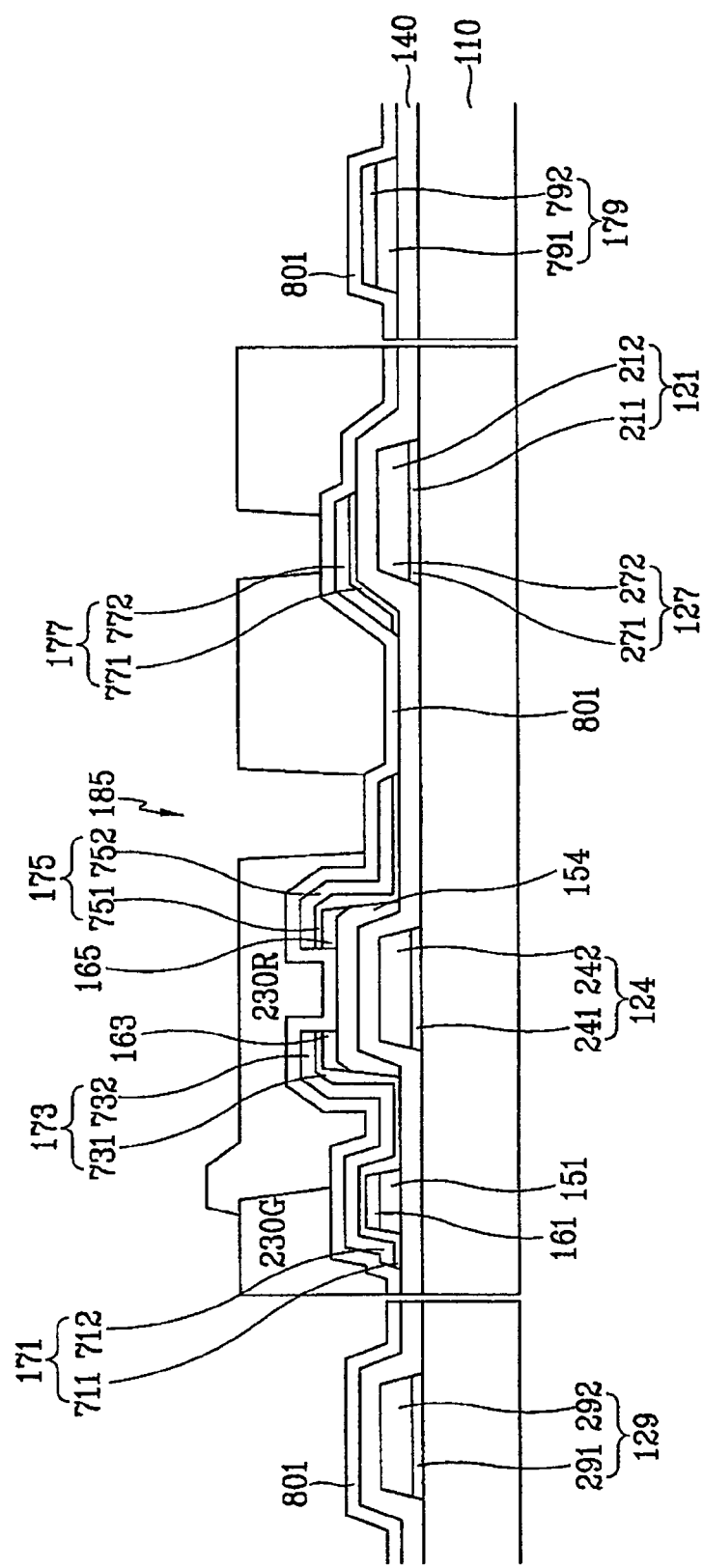

Referring to FIGS. 9A and 9B, a first passivation layer 801 made of silicon nitride is deposited and a photosensitive film for color filter stripes is coated on the first passivation layer 801. The photosensitive film includes photosensitive photopolymerizable composition containing photopolymerization starters, monomers, and binders, and non-aqueous dispersion containing one of red, green, and blue pigments.

An exposure mask (not shown) is aligned with the substrate 110 using the alignment key 178 and an alignment key 55 on the mask and the photosensitive film is exposed to light through the mask. The photosensitive film is then developed to form a kind of color filter stripes 230R, 230G or 230B.

Other two photosensitive films including remaining two of red, green, and blue pigments are coated and patterned in the same manner to form remaining two kinds of color filter stripes 230R, 230G and 230B in a sequential manner. The color filter stripes 230R, 230G and 230B have a plurality of openings exposing portions of the first passivation layer 801 that are disposed on the drain electrodes 175 and the storage capacitor conductors 177. The openings of the color filter stripes 230R, 230G and 230B may be made by the above-described steps or by a separate step.

The alignment keys 178 and 55 shown in FIG. 8 are only an example and various modifications thereof can be implemented. For example, there are one alignment key sets for each of red, green and blue color filter stripes 230R, 230G and 230B. The shapes of the alignment keys 178 and 55 can be varied.

Since the alignment key 178 is made of the same layer as the data lines 171 that are disposed about right under the color filter stripes 230R, 230G and 230B, the alignment errors for the color filter stripes 230R, 230G and 230B can be minimized and the width of the data lines 171 can be minimized.

Figure 10A:
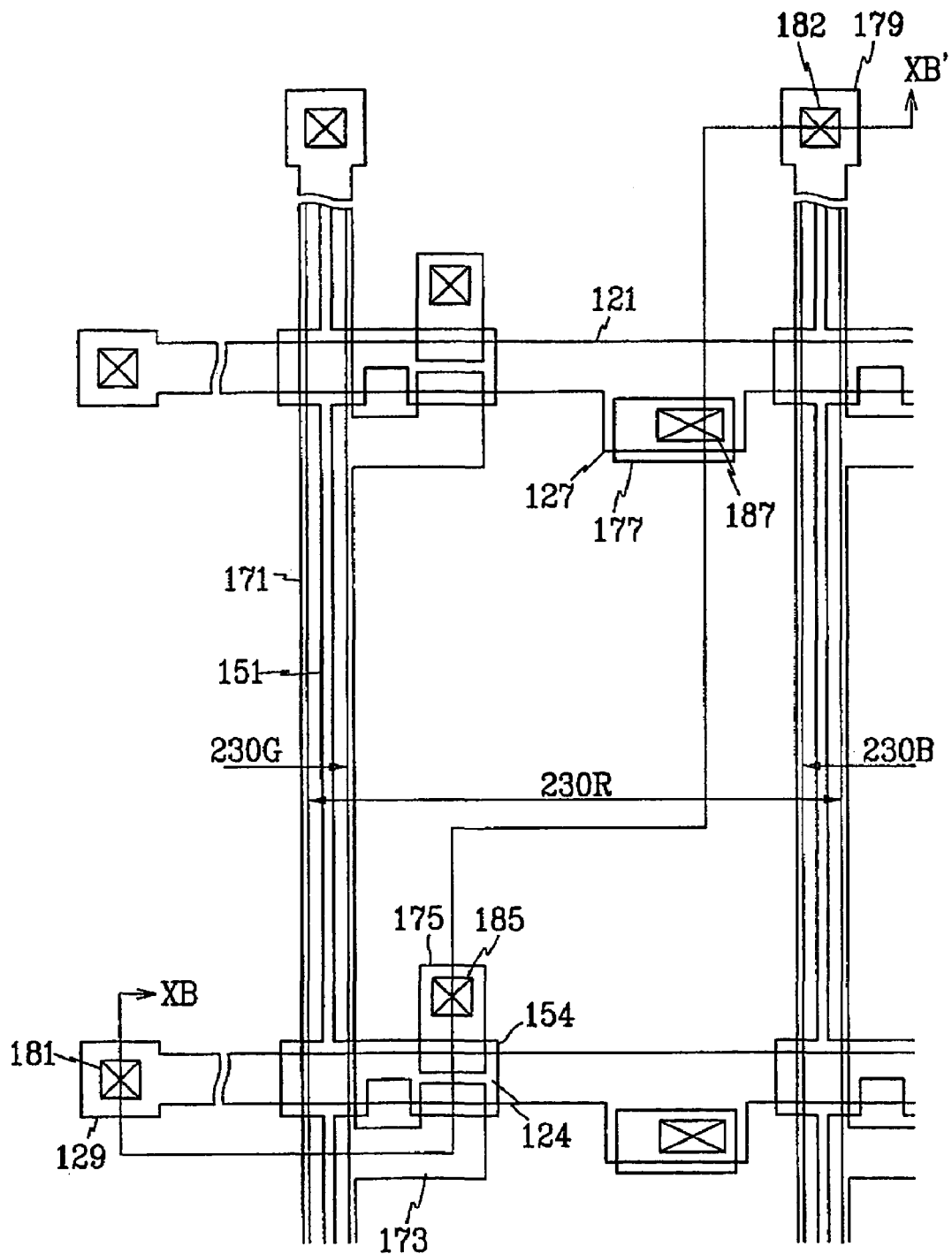
Figure 10B:
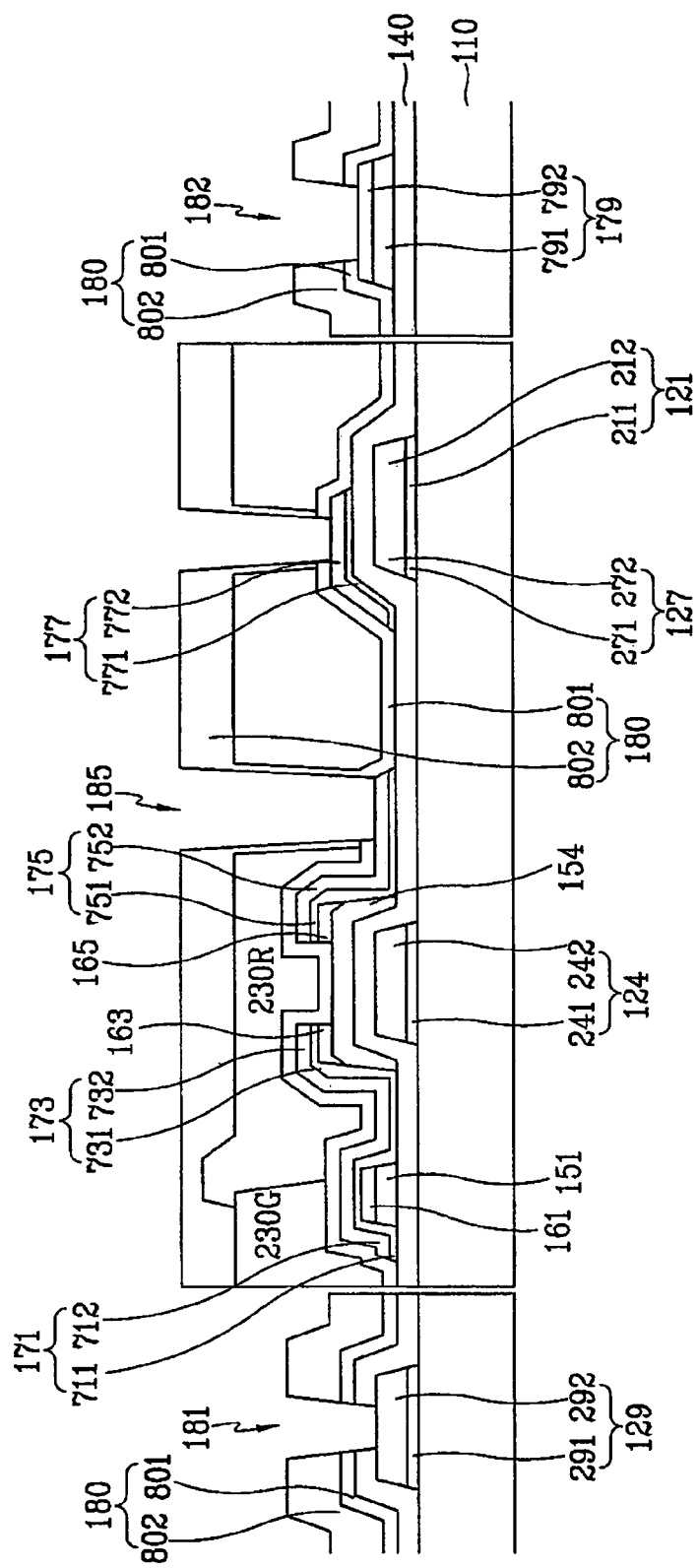

Referring to FIGS. 10A and 10B, a second passivation layer 802 is deposited on the color filter stripes 230R, 230G and 230B and the first and the second passivation layers 180 and the gate insulating layer 140 are patterned by dry etch to form a plurality of contact holes 181, 182, 185 and 187.

If portions of an Al upper film are exposed through the contact holes 181, 182, 185 and 187, the portions of the Al film are preferably removed to expose a lower film.

Finally, as shown in FIGS. 3 and 4, a plurality of pixel electrodes 190 and a plurality of contact assistants 82 are formed on the second passivation layer 802 by sputtering and photo-etching an ITO or IZO layer. The sputtering temperature of the ITO or IZO layer is preferably lower than about 250 degrees for minimizing resistance.

A plurality of columnar spacers (not shown) may be formed on the substrate 110 by coating and patterning an organic film containing black pigments.

The alignment key 178 may be removed after completing the TFT array panel.

In the meantime, the alignment key 178 may be used for aligning the TFT array panel and the common electrode panel to be assembled. In this case, the common electrode panel may have an alignment key (not shown) to match with the alignment key 178 on the TFT array panel.

A TFT array panel for an LCD according to another embodiment of the present invention will be described in detail with reference to FIGS. 11-13.

Figure 11:
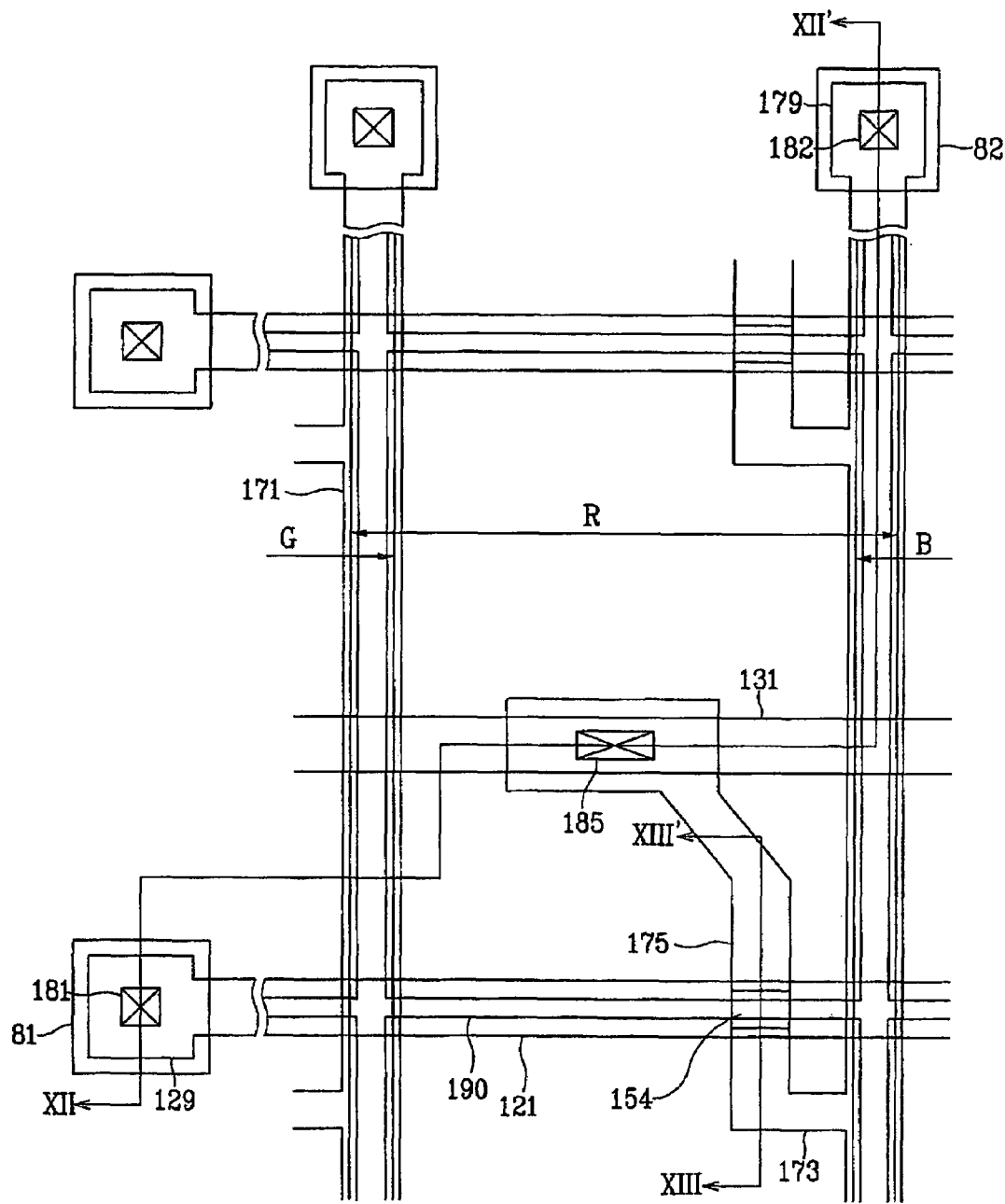
FIG. 11 is a layout view of a TFT array panel for an LCD according to another embodiment of the present invention.
Figure 12:
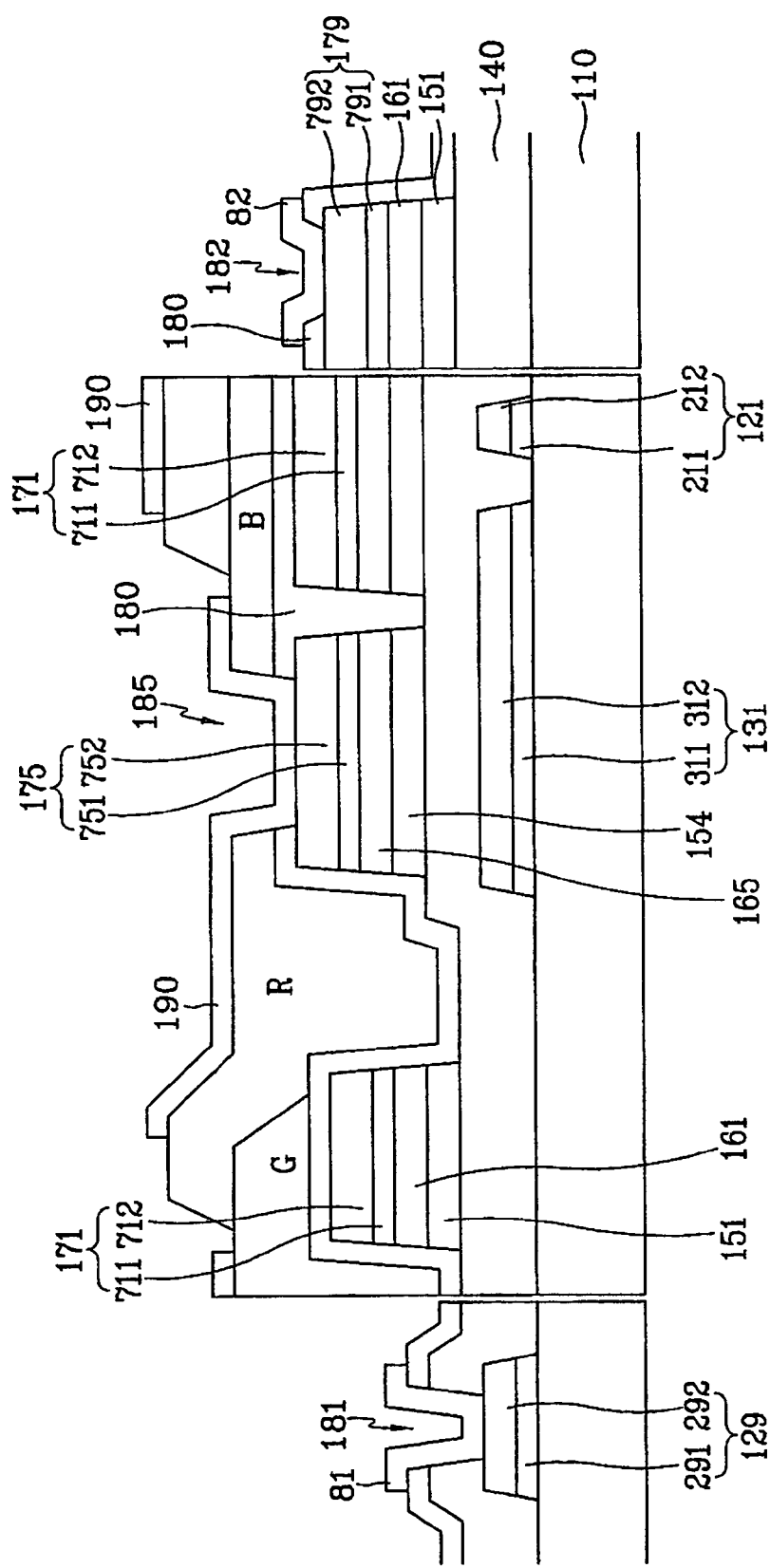
FIG. 12 is a sectional view of the TFT array panel shown in FIG. 11 taken along the line XII-XII'.

FIG. 11 is a layout view of a TFT array panel for an LCD according to another embodiment of the present invention, FIG. 12 is a sectional view of the TFT array panel shown in FIG. 11 taken along the line XII-XII', and FIG. 13 is a sectional view of the TFT array panel shown in FIG. 11 taken along the lines XIII-XIII'.

Referring to FIGS. 11-13, a layered structure of the TFT array panel according to this embodiment are almost the same as those shown in FIGS. 3 and 4.

That is, a plurality of gate lines 121 including a plurality of gate electrodes 124 and a plurality of storage electrode lines 131 including a plurality of storage electrodes 135 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 including expansions are formed on the ohmic contacts 161 and 165, and a plurality of color filter stripes 230R, 230G and 230B and a passivation layer 180 (that corresponds to the second passivation layer 802 shown in FIG. 4) are formed thereon. A plurality of contact holes 181, 182 and 185 are provided at the passivation layer 180 and the gate insulating layer 140, and a plurality of openings are provided at the color filter stripes 230R, 230G and 230B. A plurality of pixel electrodes 190 and a plurality of contact assistants 81 and 82 are formed on the passivation layer 180.

Different from the TFT array panel shown in FIGS. 3 and 4, the TFT array panel according to this embodiment provides a plurality of storage electrode lines 131, which are separated from the gate lines 121, on the same layer as the gate lines 121 without projections. The storage electrode lines 131 are supplied with a predetermined voltage such as the common voltage and they have a lower film 311 and an upper film 312. Without providing the storage capacitor conductors 177 shown in FIGS. 3 and 4, the drain electrodes 175 extend to overlap the storage electrode lines 131 to form storage capacitors. The storage electrode lines 131 may be omitted if the storage capacitance generated by the overlapping of the gate lines 121 and the pixel electrodes 191 is sufficient. The storage electrode lines 131 may be disposed near the gate lines 121 to increase the aperture ratio.

Furthermore, there is no additional passivation layer under the color filter stripes 230R, 230G and 230B and the openings of the color filter stripes 230R, 230G and 230B and the contact holes 185 match each other.

In addition, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Many of the above-described features of the TFT array panel for an LCD shown in FIGS. 3 and 4 may be appropriate to the TFT array panel shown in FIGS. 11-13.

Now, a method of manufacturing the TFT array panel shown in FIGS. 11-13 according to an embodiment of the present invention will be described in detail with reference to FIGS. 11-20B as well as FIGS. 11-13.

Figure 15A:
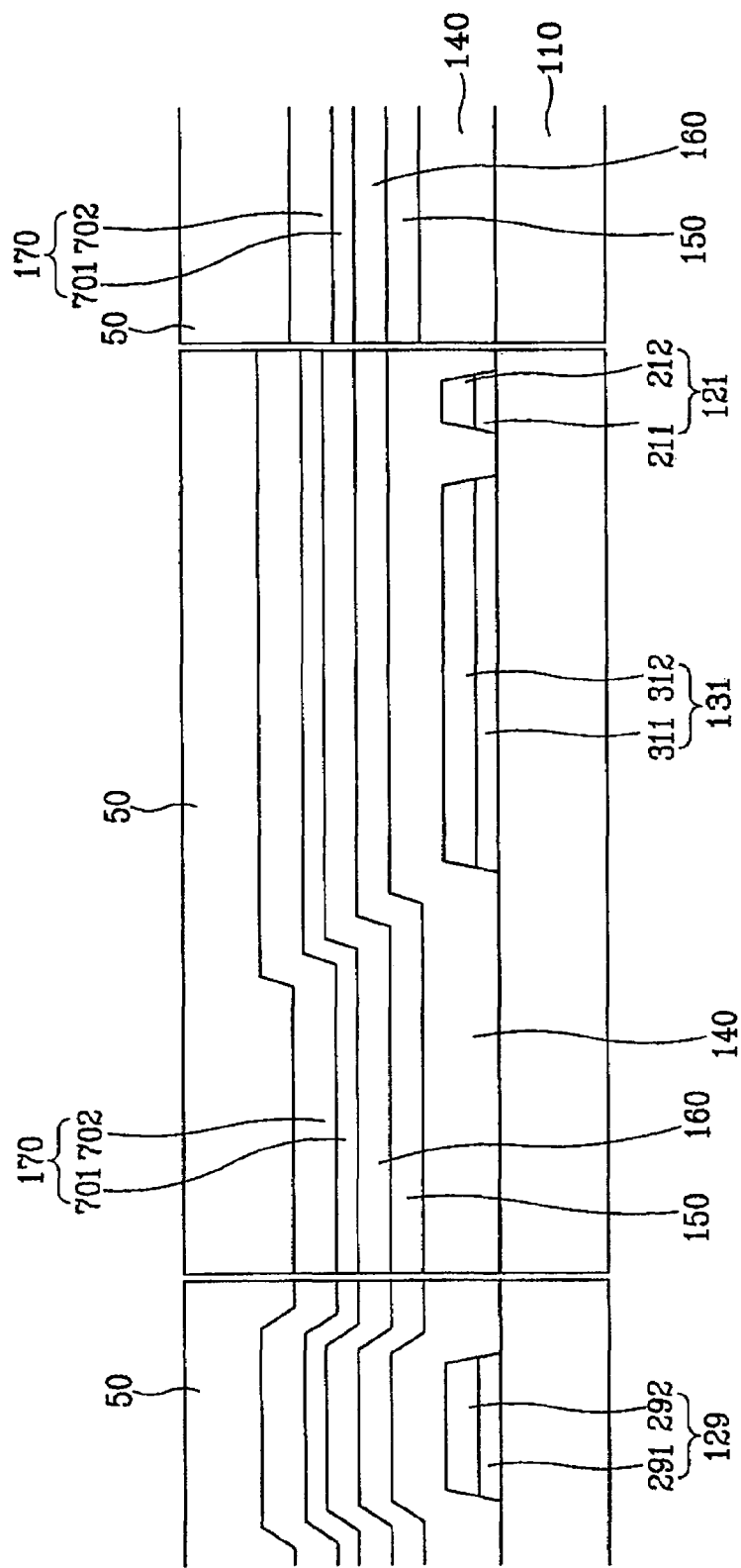
Figure 16A:
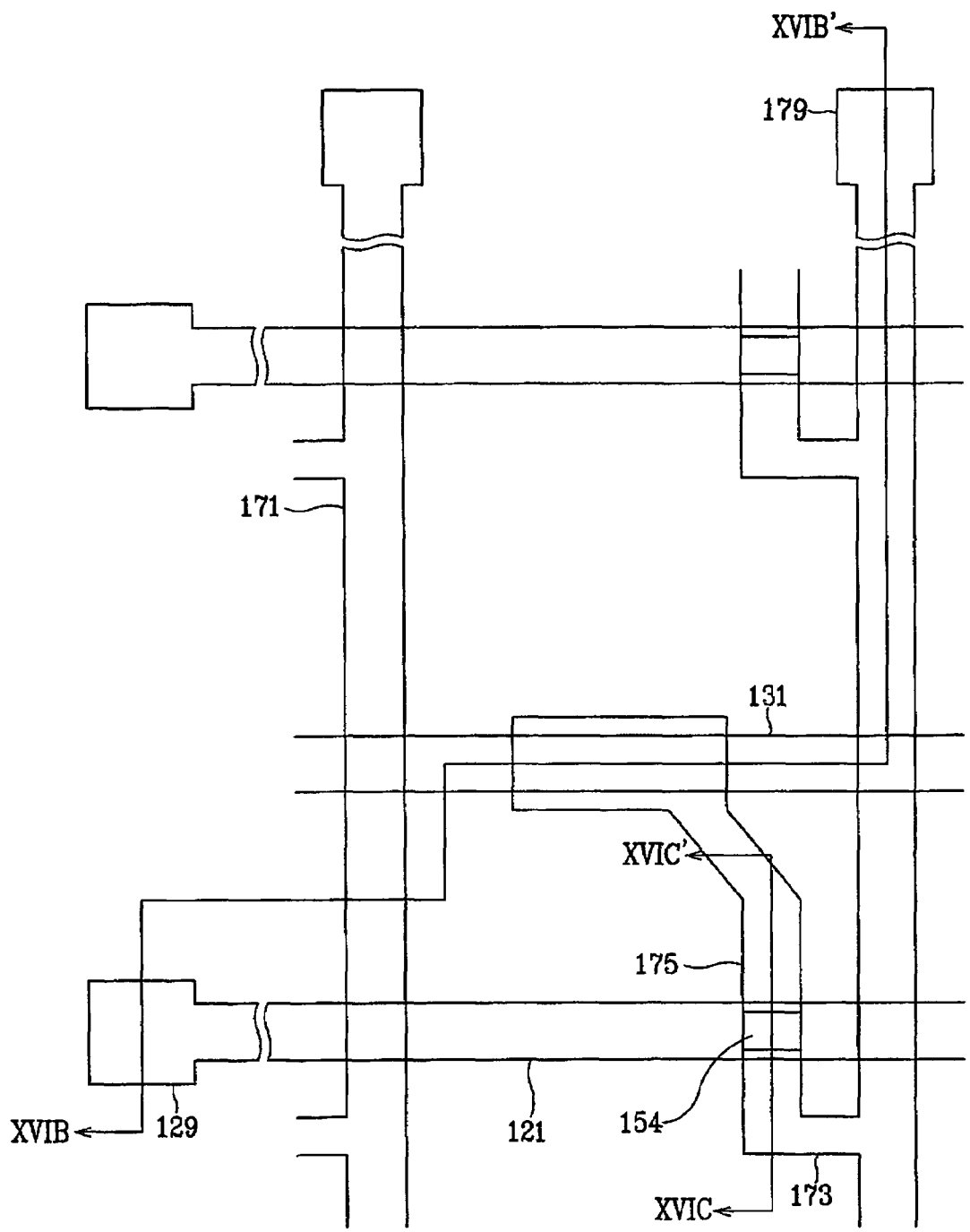
FIG. 16A is a layout view of the TFT array panel in the step following the step shown in FIGS. 15A and 15B.

FIG. 14A is a layout view of a TFT array panel shown in FIGS. 11-13 in the first step of a manufacturing method thereof according to an embodiment of the present invention; FIGS. 14B and 14C are sectional views of the TFT array panel shown in FIG. 14A taken along the lines XIVB-XIVB' and XIVC-XIVC', respectively; FIGS. 15A and 15B are sectional views of the TFT array panel shown in FIG. 14A taken along the lines XIVB-XIVB' and XIVC-XIVC', respectively, and illustrate the step following the step shown in FIGS. 14B and 14C; FIG. 16A is a layout view of the TFT array panel in the step following the step shown in FIGS. 15A and 15B; FIGS. 16B and 16C are sectional views of the TFT array panel shown in FIG. 16A taken along the lines XVIB-XVIB' and XVIC-XVIC', respectively; FIGS. 17A, 18A and 19A and FIGS. 17B, 18B and 19B are sectional views of the TFT array panel shown in FIG. 16A taken along the lines XVIB-XVIB' and XVIC-XVIC', respectively, which illustrate the step following the step shown in FIGS. 14B and 14C; FIG. 20A is a layout view of a TFT array panel in the step following the step shown in FIGS. 19A and 19B; FIGS. 20B and 20C are sectional views of the TFT array panel shown in FIG. 20A taken along the lines XXB-XXB' and XXC-XXC', respectively; FIG. 21A is a layout view of a TFT array panel in the step following the step shown in FIGS. 20A-20C; and FIGS. 21B and 21C are sectional views of the TFT array panel shown in FIG. 21A taken along the lines XXIB-XXIB' and XXIC-XXIC', respectively.

Referring to FIGS. 14A-14C, a plurality of gate lines 121 including a plurality of gate electrodes 124 and a plurality of storage electrode lines 131 are formed on a substrate 110 by depositing and photo-etching a conductive film.

Referring to FIGS. 15A and 15B, a gate insulating layer 140, an intrinsic a-Si layer 150, and an extrinsic a-Si layer 160 are sequentially deposited by CVD such that the layers 140, 150 and 160 bear thickness of about 1,500-5,000 Å, about 500-2,000 Å and about 300-600 Å, respectively. A conductive layer 170 including a lower film 701 and an upper film 702 is deposited by sputtering, and a photoresist film 50 with the thickness of about 1-2 microns is coated on the conductive layer 170.

The photoresist film 50 is exposed to light through an exposure mask (not shown), and developed such that the developed photoresist has a position dependent thickness. The photoresist shown in FIGS. 16B and 16C includes a plurality of first to third portions with decreased thickness. The first portions located on wire areas A and the second portions located on channel areas C are indicated by reference numerals 52 and 54, respectively, and no reference numeral is assigned to the third portions located on remaining areas B since they have substantially zero thickness to expose underlying portions of the conductive layer 170. The thickness ratio of the second portions 54 to the first portions 52 is adjusted depending upon the process conditions in the subsequent process steps. It is preferable that the thickness of the second portions 54 is equal to or less than half of the thickness of the first portions 52, and in particular, equal to or less than 4,000 Å.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s)

with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

The different thickness of the photoresist 52 and 54 enables to selectively etch the underlying layers when using suitable process conditions. Therefore, a plurality of data lines 171 including a plurality of source electrodes 173, a plurality of drain electrodes 175, and an alignment key 178 (shown in FIGS. 2 and 8) for color filter stripes as well as a plurality of ohmic contact stripes 161 including a plurality of projections 163, a plurality of ohmic contact islands 165 and a plurality of semiconductor stripes 151 including a plurality of projections 154 are obtained as shown in FIGS. 16A, 19A and 19B by a series of etching steps.

For descriptive purpose, portions of the conductive layer 170, the extrinsic a-Si layer 160, and the intrinsic a-Si layer 150 on the wire areas A are called first portions, portions of the conductive layer 170, the extrinsic a-Si layer 160, and the intrinsic a-Si layer 150 on the channel areas C are called second portions, and portions of the conductive layer 170, the extrinsic a-Si layer 160, and the intrinsic a-Si layer 150 on the remaining areas B are called third portions.

An exemplary sequence of forming such a structure is as follows:

(1) Removal of third portions of the conductive layer 170, the extrinsic a-Si layer 160 and the intrinsic a-Si layer 150 on the wire areas A;

(2) Removal of the second portions 54 of the photoresist;

(3) Removal of the second portions of the conductive layer 170 and the extrinsic a-Si layer 160 on the channel areas C; and (4) Removal of the first portions 52 of the photoresist.

Another exemplary sequence is as follows:

(1) Removal of the third portions of the conductive layer 170;

(2) Removal of the second portions 54 of the photoresist;

(3) Removal of the third portions of the extrinsic a-Si layer 160 and the intrinsic a-Si layer 150;

(4) Removal of the second portions of the conductive layer 170;

(5) Removal of the first portions 52 of the photoresist; and (6) Removal of the second portions of the extrinsic a-Si layer 160.

The first example is described in detail.

Figure 17A:
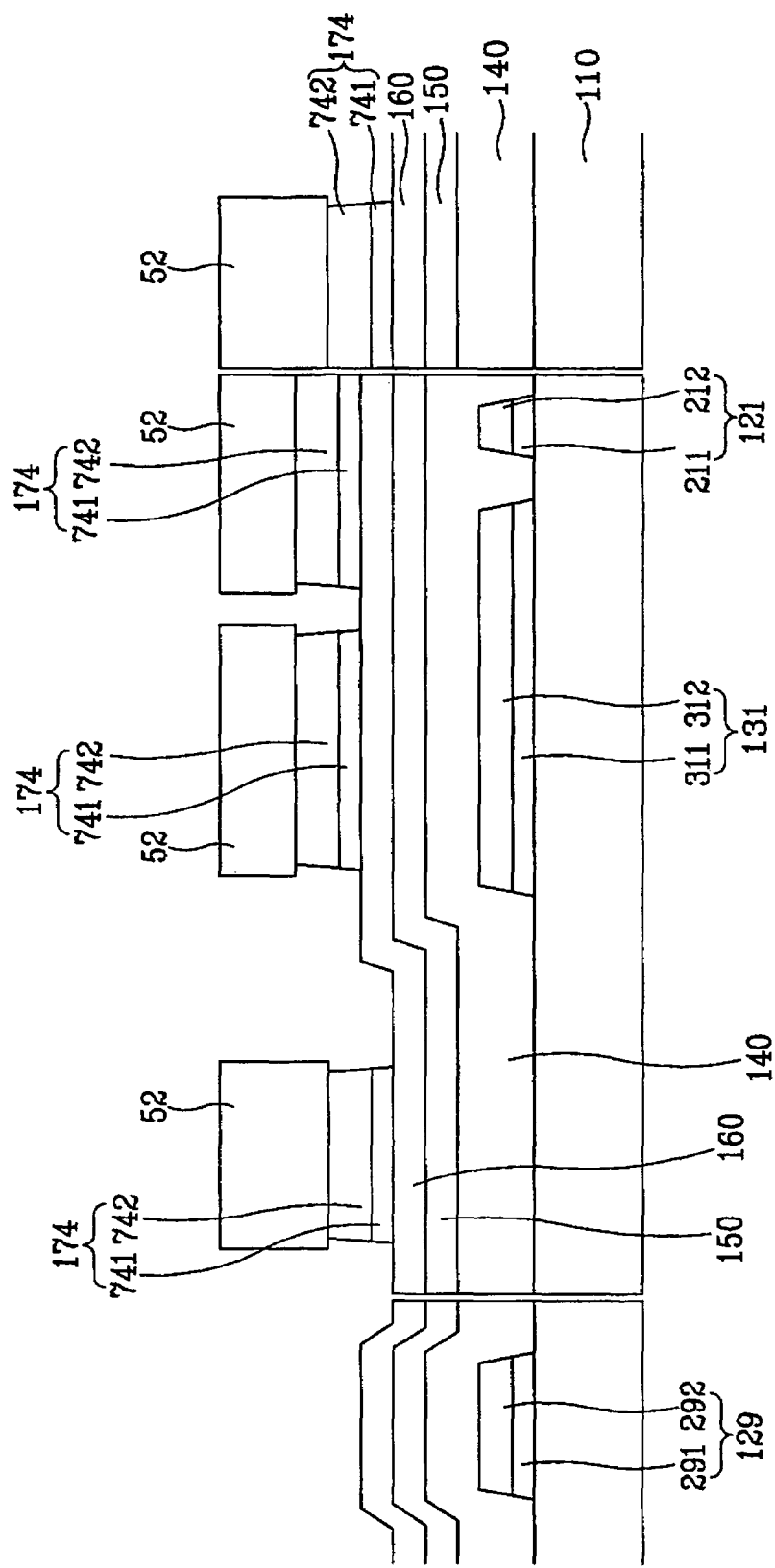
Figure 17B:
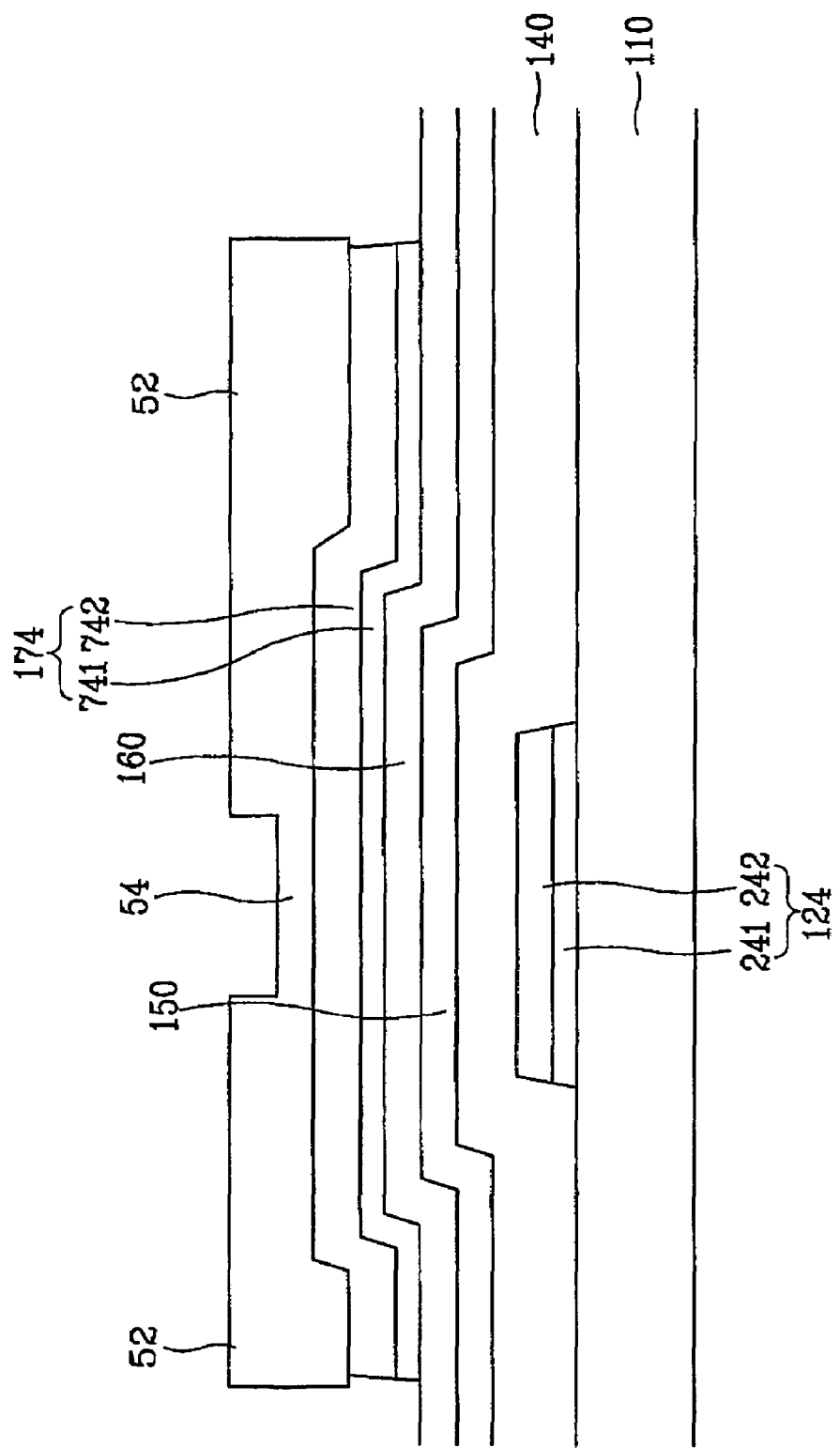

Referring to FIGS. 17A and 17B, the exposed third portions of the conductive layer 170 on the remaining areas B are removed by wet etching or dry etching to expose the underlying third portions of the extrinsic a-Si layer 160. An Al containing metal film is preferably wet etched, while a Mo containing metal film can be etched both by dry etch and wet etch. The lower and the upper films may be simultaneously etched under the same etching condition.

Reference numeral 174 indicates portions of the conductive layer 170 including the data lines 171 and the drain electrode 175 connected to each other and lower and upper films thereof is indicated by 741 and 742, respectively. The dry etching may etch out the top portions of the photoresist 52 and 54.

In this step, an alignment key 178 for color filter stripes is completed.

Figure 18A:
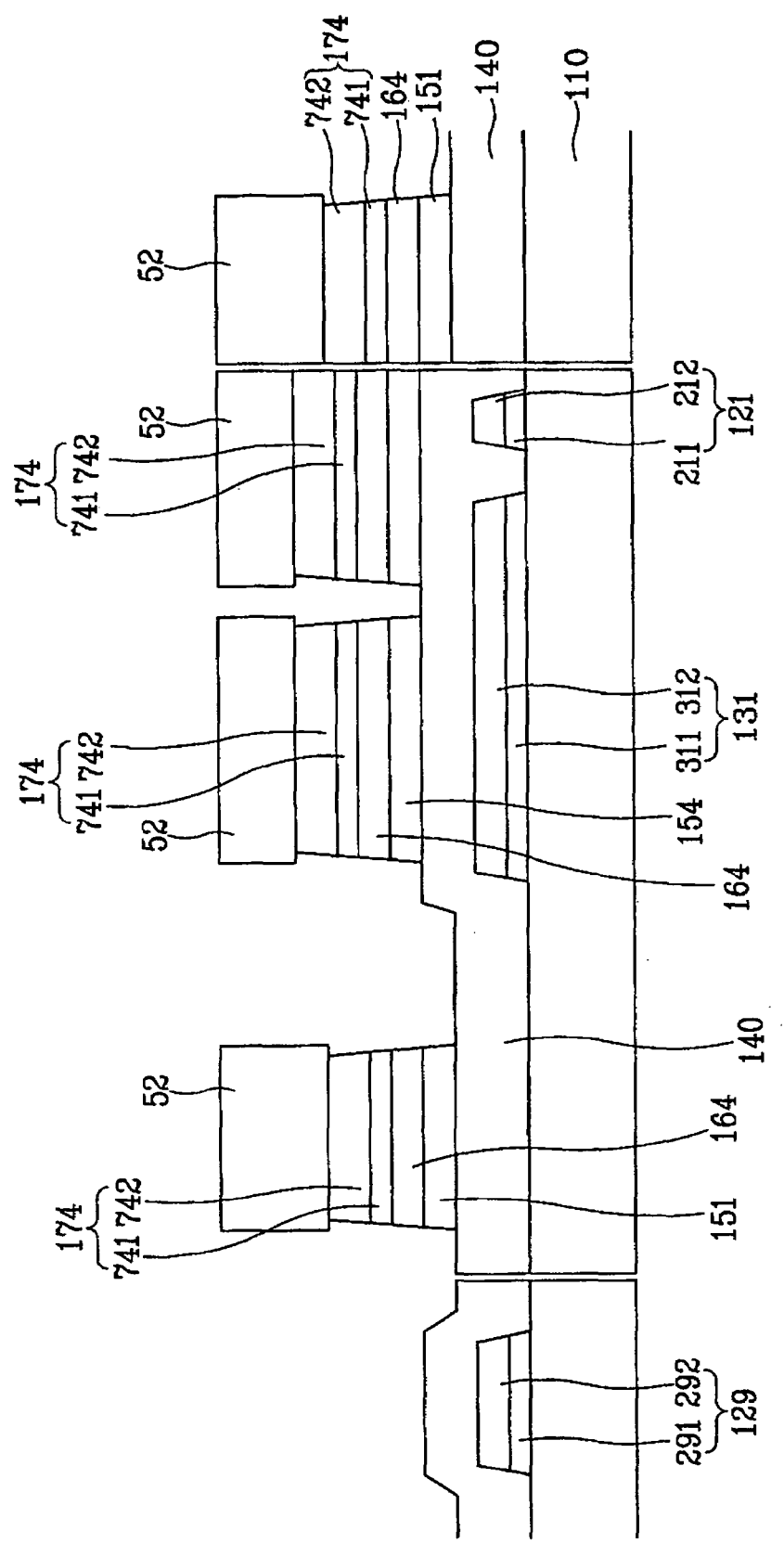

Referring to FIGS. 18A and 18B, the third portions of the extrinsic a-Si layer 160 on the areas B and of the intrinsic a-Si layer 150 are removed preferably by dry etching and the second portions 54 of the photoresist are removed to expose the second portions of the conductors 174. The removal of the second portions 54 of the photoresist are performed either simultaneously with or independent from the removal of the third portions of the extrinsic a-Si layer 160 and of the intrinsic a-Si layer 150. Residue of the second portions 54 of the photoresist remained on the channel areas C is removed by ashing.

The semiconductor stripes 151 are completed in this step, and reference numeral 164 indicates portions of the extrinsic a-Si layer 160 including the ohmic contact stripes and islands 161 and 165 connected to each other, which are called "extrinsic semiconductor stripes." The lower film 701 of the conductive layer 170, the extrinsic a-Si layer 160, and the intrinsic a-Si layer 150 are dry-etched in sequence to simplify the manufacturing process. In this case, the dry etching of the three film and layers 701, 160 and 150 may be performed in-situ in a single etching chamber.

Referring to FIGS. 19A and 19B, the second portions of the conductors 174 and the extrinsic a-Si stripes 164 on the channel areas C as well as the first portion 52 of the photoresist are removed.

As shown in FIG. 19B, top portions of the projections 154 of the intrinsic semiconductor stripes 151 on the channel areas C may be removed to cause thickness reduction, and the first portions 52 of the photoresist are etched to a predetermined thickness.

In this way, each conductor 174 is divided into a data line 171 and a plurality of drain electrodes 175 to be completed, and each extrinsic semiconductor stripe 164 is divided into an ohmic contact stripe 161 and a plurality of ohmic contact islands 165 to be completed.

Referring to FIGS. 20A-20C, a plurality of color filter stripes 230R, 230G and 230B are formed by coating photosensitive organic films respectively containing red, green, and blue pigments, aligning an exposure mask (not shown) having an alignment key 55 shown in FIG. 8 with the substrate 110 by using the alignment keys 178 and 55, and light exposing and developing the organic films in a sequential manner.

Referring to FIGS. 19, 20A and 20B, the passivation layer 180, the color filter stripes 230R, 230G and 230B, and the gate insulating layer 140 are patterned by etch to form a plurality of contact holes 181, 182 and 185.

Finally, as shown in FIGS. 11-13, a plurality of pixel electrodes 190 and a plurality of contact assistants 81 and 82 are formed on the color filter stripes 230R, 230G and 230B by sputtering and photo-etching an ITO or IZO layer. The etching of the IZO film may include wet etching using a Cr etchant such as $HNO_3/(NH_4)_2Ce(NO_3)_6/H_2O$, which does not erode the exposed Al portions of the gate lines 121, the data lines 171, and the drain electrodes 175 through the contact holes 182, 183 and 185.

Since the manufacturing method of the TFT array panel according to an embodiment simultaneously forms the data lines 171, the drain electrodes 175, the semiconductors 151, and the ohmic contacts 161 and 165 using one photolithography process, the manufacturing process is simplified by omitting a photolithography step.

An LCD according to an embodiment of the present invention is described in detail with reference to FIGS. 22 and 23.

FIG. 22 is a layout view of a TFT array panel according to another embodiment of the present invention, and FIG. 23 is a sectional view of the TFT array panel shown in FIG. 22 taken along the lines XXIII-XXIII'.

A plurality of gate lines 121 and a plurality of storage electrode lines 131 are formed on an insulating substrate 110.

The gate lines 121 extend substantially in a transverse direction and are separated from each other and transmit gate signals. Each gate line 121 includes a plurality of projections forming a plurality of gate electrodes 124 and an end portion 129 having a large area for contact with another layer or an external device.

Each storage electrode line 131 extends substantially in the transverse direction and includes a plurality of projections forming storage electrodes 133. Each storage electrode 133 has a shape of a diamond or a rectangle rotated by about 45 degrees and they are located close to the gate lines 121. The storage electrode lines 131 are supplied with a predetermined voltage such as a common voltage, which is applied to a common electrode (not shown) on a common electrode panel (not shown).

The gate lines 121 and the storage electrode lines 131 have a multi-layered structure including two films having different physical characteristics, a lower film and an upper film. The upper film is preferably made of low resistivity metal including Al containing metal, Ag containing metal, or Cu containing metal for reducing signal delay or voltage drop in the gate lines 121 and the storage electrode lines 131. On the other hand, the lower film is preferably made of material such as Cr, Mo, Mo alloy, Ta, or Ti, which has good physical, chemical, and electrical contact characteristics with other materials such as ITO or IZO. A good exemplary combination of the lower film material and the upper film material is Cr and Al—Nd alloy. In FIG. 23, the lower and the upper films of the gate electrodes 124 are indicated by reference numerals 241 and 242, respectively, and the lower and the upper films of the storage electrodes 133 are indicated by reference numerals 331 and 332, respectively. The upper film of the end portions 129 of the gate lines 121 are removed at least in part to expose the lower film.

The gate lines 121 and the storage electrode lines 131 may have a single layer structure or may include three or more layers.

In addition, the lateral sides of the gate lines 121 and the storage electrode lines 131 are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated as "a-Si") or polysilicon are formed on the gate insulating layer 140. Each semiconductor stripe 151 extends substantially in the longitudinal direction while it is curved periodically. Each semiconductor stripe 151 has a plurality of projections 154 branched out toward the gate electrodes 124.

A plurality of ohmic contact stripes and islands 161 and 165 preferably made of silicide or n+hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range between about 30-80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 has an end portion 179 having a large area for contact with another layer or an external device and it includes a plurality of pairs of oblique portions and a plurality of longitudinal portions such that it curves periodically. A pair of oblique portions are connected to each other to form a chevron and opposite ends of the pair of oblique portions are connected to respective longitudinal portions. The oblique portions of the data lines 171 make an angle of about 45 degrees with the gate lines 121, and the longitudinal portions cross over the gate electrodes 124. The length of a pair of oblique portions is about one to nine times the length of a longitudinal portion, that is, it occupies about 50-90 percents of the total length of the pair of oblique portions and the longitudinal portion.

Each drain electrode 175 includes a rectangular or rhombic expansion overlapping a storage electrode 133. The edges of the expansion of the drain electrode 175 are substantially parallel to the edges of the storage electrodes 133. Each longitudinal portion of the data lines 171 includes a plurality of projections such that the longitudinal portion including the projections forms a source electrode 173 partly enclosing an end portion of a drain electrode 175. Each set of a gate electrode 124, a source electrode 173, and a drain electrode 175 along with a projection 154 of a semiconductor stripe 151 form a TFT having a channel formed in the semiconductor projection 154 disposed between the source electrode 173 and the drain electrode 175.

The data lines 171 and the drain electrodes 175 also include a lower film 711 and 751 preferably made of Mo, Mo alloy, Cr, Ta, or Ti and an upper film 712 and 752 located thereon and preferably made of Al containing metal, Ag containing metal, or Cu containing metal. In FIG. 2, the lower and the upper films of the source electrodes 173 are indicated by reference numerals 731 and 732, respectively. The upper film 752 of the drain electrodes 175 as well as the lower film of the end portions 179 of the data lines 171 are removed at least in part to expose the lower film 751.

Like the gate lines 121 and the storage electrode lines 131, the data lines 171 and the drain electrodes 175 have inclined lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween.

A first passivation layer 801 preferably made of silicon nitride or silicon oxide is formed A plurality of red, green and blue color filter stripes 230R, 230G and 230B are formed on the data lines 171, the drain electrodes 175, the storage conductors 177, and the exposed portions of the semiconductor stripes 151. Each of the color filter stripes 230R, 230G and 230B are disposed substantially between adjacent two the data lines 171 and extends substantially in the longitudinal direction with being periodically curved. The color filter stripes 230R, 230G and 230B are not disposed on a peripheral area which is provided with the end portions 179 of the data lines 171. The color filter stripes 230R, 230G and 230B have a plurality of openings placed on the drain electrodes 175 and having tapered sidewalls. Edges of adjacent color filter stripes 230R, 230G and 230B exactly match with each other. However, the edges may overlap to block the light leakage between the pixel areas.

A passivation layer 180 is formed on the color filter stripes 230R, 230G and 230B. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride and silicon oxide.

The passivation layer 180 has a plurality of contact holes 182b and 185b exposing the end portions 179 of the data lines 171 and the drain electrodes 175, respectively. The passivation layer 180 and the gate insulating layer 140 have a plurality of contact holes 181b exposing the end portions 129 of the gate lines 121. The above-described exposed portions of the lower film 751 are exposed through the contact holes 185b. The contact holes 185b are disposed within the openings of the color filter stripes 230R, 230G and 230B. The contact holes 181b, 182b and 185b can have various shapes such as polygon or circle. The area of each contact hole 181b or 182b is preferably equal to or larger than 0.5 mm×15 µm and not larger than 2 mm×60 µm. The sidewalls 181a, 182a and 185a of the contact holes 181b, 182b and 185b are inclined with an angle of about 30-85 degrees or have stepwise profiles.

A plurality of pixel electrodes 190 and a plurality of contact assistants 81 and 82, which are preferably made of ITO or IZO, are formed on the passivation layer 180.

Each pixel electrode 190 is located substantially in an area enclosed by the data lines 171 and the gate lines 121, and thus it also forms a chevron. The pixel electrodes 190 cover the storage electrode lines 131 including the storage electrodes 133 and the expansions of the drain electrodes 175 and they have chamfered edges substantially parallel to edges of the storage electrodes 133 that are close to the chamfered edges.

The pixel electrodes 190 are physically and electrically connected to the drain electrodes 175 through the contact holes 185b such that the pixel electrodes 190 receive the data voltages from the drain electrodes 175.

The pixel electrodes 190 overlap the data lines 171 as well as the gate lines 121 to increase aperture ratio.

The contact assistants 81 and 82 are connected to the exposed end portions 129 of the gate lines 121 and the exposed end portions 179 of the data lines 171 through the contact holes 181b and 182b, respectively. The contact assistants 81 and 82 protect the exposed portions 129 and 179 and complement the adhesion between the exposed portions 129 and 179 and external devices.

The TFT array panel according to this embodiment can be manufactured by the above-described manufacturing method of the TFT panel shown in FIGS. 3 and 4. In particular, an alignment key 178 (shown in FIG. 8) is formed of the same layer as the data lines 171 and the red, green and blue color filter stripes 230R, 230G and 230B are formed by using the alignment key. Accordingly, the alignment errors can be minimized and the width of the data lines 171 can be optimized.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for manufacturing a thin film transistor array panel, the method comprising:
    forming a gate line including a gate electrode on a substrate;
    depositing a gate insulating layer;
    forming a semiconductor layer on the gate insulating layer;
    forming an ohmic contact layer on the semiconductor layer;
    forming a data line including a source electrode and a drain electrode on the ohmic contact layer at least in part;
    forming an alignment key in the same layer as the data line;
    coating a first photosensitive film for a color filter;
    aligning a mask for color filter with the substrate provided with the first photosensitive film using the alignment key;
    forming a first color filter by light exposure and developing the first photosensitive film; and,
    forming a pixel electrode connected to the drain electrode, wherein the semiconductor layer, the ohmic contact layer, the data line, and the drain electrode are formed by a single photolithography step.

2. The method of claim 1, further comprising:
    forming a passivation layer under the pixel electrode.

3. The method of claim 2, wherein the passivation layer is disposed on or under the color filter.

4. The method of claim 3, wherein the passivation layer includes silicon nitride or silicon oxide.

5. The method of claim 3, wherein the passivation layer includes organic insulator.

6. The method of claim 1, further comprising:
    coating a second photosensitive film for a color filter;
    aligning the mask for color filter with the substrate provided with the second photosensitive film using the alignment key;
    forming a second color filter by light exposure and developing the first photosensitive film;
    coating a third photosensitive film for a color filter;
    aligning the mask for color filter with the substrate provided with the third photosensitive film using the alignment key; and,
    forming a third color filter by light exposure and developing the first photosensitive film,
    wherein the first to the third color filters represent red, green, and blue colors.

7. The method of claim 6, wherein adjacent two of the first to the third color filters overlap each other in part.

8. A thin film transistor array panel, comprising:
    a gate line including a gate electrode formed on a substrate;
    a gate insulating layer deposited on the gate electrode;
    a semiconductor layer formed on the gate insulating layer;
    an ohmic contact layer formed on the semiconductor layer;
    a data line including a source electrode and a drain electrode formed at least in part on the ohmic contact layer;
    an alignment key formed in the same layer as the data line;
    a first color filter formed on and aligned with the substrate using the alignment key; and, a pixel electrode connected to the drain electrode,
wherein the first color filter is formed so as to partially overlap or to be partially overlapped by at least one adjacent color filter.

9. The panel of claim 8, further comprising:
a passivation layer formed under the pixel electrode.

10. The panel of claim 9, wherein the passivation layer is disposed above or below the first color filter.

11. The panel of claim 10, wherein the passivation layer comprises silicon nitride or silicon oxide.

12. The panel of claim 10, wherein the passivation layer comprises an organic insulator.

13. The panel of claim 8, further comprising:
second and third color filters formed on and aligned with the substrate using the alignment key, and
wherein the first to the third color filters represent red, green, and blue colors.

14. The panel of claim 13, wherein adjacent pairs of the first, second and third color filters partially overlap each other.

15. The panel of claim 8, wherein the semiconductor layer, the ohmic contact layer, the data line, and the drain electrode are formed by a single photolithography step.

16. A method for manufacturing a thin film transistor array panel, the method comprising:
forming a gate line including a gate electrode on a substrate;
depositing a gate insulating layer;
forming a semiconductor layer on the gate insulating layer;
forming an ohmic contact layer on the semiconductor layer;
forming a data line including a source electrode and a drain electrode on the ohmic contact layer at least in part;
forming an alignment key in the same layer as the data line;
coating a first photosensitive film for a color filter;
providing a mask for making a color filter from the first photosensitive film;
aligning the mask with the substrate using the alignment key;
forming a first color filter by light exposure and developing the first photosensitive film; and,
forming a pixel electrode connected to the drain electrode,
wherein the first color filter is formed so as to partially overlap or to be partially overlapped by at least one adjacent color filter.

17. The method of claim 16, further comprising:
forming a passivation layer under the pixel electrode.

18. The method of claim 17, wherein the passivation layer is disposed on or under the color filter.

19. The method of claim 18, wherein the passivation layer includes silicon nitride or silicon oxide.

20. The method of claim 18, wherein the passivation layer includes an organic insulator.

21. The method of claim 16, further comprising:
coating a second photosensitive film for a second color filter;
aligning the mask for color filter with the substrate provided with the second photosensitive film using the alignment key;
forming a second color filter by light exposure and developing the first photosensitive film;
coating a third photosensitive film for a color filter;
aligning the mask for color filter with the substrate provided with the third photosensitive film using the alignment key; and,
forming a third color filter by light exposure and developing the first photosensitive film,
wherein the first to the third color filters represent red, green, and blue colors.

22. The method of claim 21, wherein adjacent two of the first to the third color filters overlap each other in part.

23. The method of claim 16, wherein the semiconductor layer, the ohmic contact layer, the data line, and the drain electrode are formed by a single photolithography step.

24. A thin film transistor array panel manufactured in accordance with the method of claim 1.

25. A thin film transistor array panel manufactured in accordance with the method of claim 16.

* * * * *